United States Patent [19]

Nishio et al.

[11] Patent Number: 5,633,214

[45] Date of Patent: May 27, 1997

[54] BORON NITRIDE-CONTAINING MATERIAL AND METHOD THEREOF

[75] Inventors: Hiroaki Nishio; Hiroyuki Yoshida, both of Kawasaki, Japan

[73] Assignee: NKK Corporation, Tokyo, Japan

[21] Appl. No.: 494,959

[22] Filed: Jun. 26, 1995

[30] Foreign Application Priority Data

Jun. 30, 1994 [JP] Japan ................. 6-149669

[51] Int. Cl.$^6$ ................. C04B 35/583
[52] U.S. Cl. ................. 501/96.4; 501/92; 501/103
[58] Field of Search ................. 423/290, 411, 423/412; 501/96, 98, 92, 103

[56] References Cited

U.S. PATENT DOCUMENTS

| | | | |
|---|---|---|---|
| 4,107,276 | 8/1978 | Schwetz et al. | 423/290 |
| 5,147,623 | 9/1992 | Eun et al. | 501/96 |

FOREIGN PATENT DOCUMENTS

| | | |
|---|---|---|
| 0 519 492 | 12/1992 | European Pat. Off. |
| 2 681 590 | 3/1993 | France . |
| 38-1610 | 3/1963 | Japan . |
| 42-24669 | 11/1967 | Japan . |
| 48-014559 | 5/1973 | Japan . |
| 49-040124 | 10/1974 | Japan . |
| 61-256905 | 11/1985 | Japan . |
| 61-132564 | 6/1986 | Japan . |
| 62-139866 | 6/1987 | Japan . |
| 3-268849 | 11/1991 | Japan . |
| 4-325461 | 11/1992 | Japan . |
| 5-201771 | 8/1993 | Japan . |
| 7-048105 | 2/1995 | Japan . |

OTHER PUBLICATIONS

Database WPI, Week 9252, Derwent Publications Ltd., London, GB; AN 92–428946 of JP-A-04 325 461 (Hitachi Ltd), 13 Nov. 1992.

*Primary Examiner*—Karl Group
*Attorney, Agent, or Firm*—Frishauf, Holtz, Goodman, Langer & Chick, P.C.

[57] ABSTRACT

A boron-nitride-containing material of multi-component system is obtained at a low cost by heating a mixed powder containing a boride and an oxide in a nitrifying atmosphere, whereby a part or the whole of the oxide is reduced with the element bonded to boron of the boride to convert the raw materials to one or more kinds of an oxide having less bonded oxygen, an acid nitride, a nitride, a carbide, and a boride and also boron nitride is formed. A sintered product of a boron-nitride-containing material is obtained by packing a mixed powder containing borides in a heat-resistant mold and heating the packed powders in a nitrifying atmosphere while restraining the packed powders by the mold. The sintered product is obtained in which neither expansion nor deformation occurred and no cracks formed.

25 Claims, 2 Drawing Sheets

BORON NITRIDE-CONTAINING MATERIAL AND METHOD THEREOF

BACKGROUND OF THE INVENTION

1. Field of the invention

The present invention relates to a boron-nitride-containing material and a method thereof.

2. Description of the Related Arts

Hexagonal boron nitride is known to be a chemically stable material which has a high heat conductivity, an excellent electrical insulating property, and an excellent lubricating property and does not react with a molten product of iron, copper, nickel, zinc, gallium, arsenic, glass, cryolite, etc. Also, hexagonal boron nitride is stable in air until 950° C. and in an inert gas or nitrogen gas atmosphere until 2,200° C. Also, hexagonal boron nitride has the feature that machining such as cutting, grinding, etc., can be easily performed as in the case of metals. Boron nitride itself or material containing boron nitride has been supplied for various uses by utilizing that feature.

The uses as the powder of hexagonal boron nitride, has been used as additives for plastics, lubricants, mold releasing agents for aluminum die casting and a glass molding, etc. Also, sintered hexagonal boron nitride, has been used for insulating parts, heat-resistant parts, crucibles for molten metals, brake rings for horizontal continuous casting, heat-emitting members, setters for sintering the powder moldings of metals or ceramics, mold materials, etc. Also the application thereof for refractories for casting, such as upper nozzles, immersion nozzles, etc., has been attempted.

As a method of synthesizing the powder of hexagonal boron nitride having a wide use as described above, the following methods are known.

(1) A method of synthesizing the powder thereof by heating borax and urea to a temperature of at least 800° C. in an ammonia atmosphere as described in JP-B-38-1610 (the term "JP-B" as used herein means "examined Japanese Patent Publication").

(2) A method of synthesizing the powder thereof by heating a mixture of boric acid or boron oxide and calcium phosphate in an ammonia atmosphere as descried in JP-B-42-24669.

(3) A method of synthesizing the powder thereof by heating boric acid and a nitrogen-containing compound (urea, melamine, dicyandiamide, etc.) to a temperature of at least 1600° C. as described in JP-B-48-14559.

Also, a boron nitride powder synthesized at a low temperature of 1400° C. or less contains unreacted materials, boron oxide, and B-N-O series intermediates in addition to boron nitride (BN) and also the boron nitride powder has an insufficient crystallization and is chemically unstable. Thus, the crude boron nitride powder is once cooled and washed with water followed by drying, and subjected to a heat treatment again for purification and crystallization. As one of these methods, a method of mixing the powder with a carbonaceous powder and heating the mixture to a temperature of at least 1500° C. in an ammonia gas is known as described in JP-A-61-256905 (the term "JP-A" as used herein means "unexamined Japanese patent application").

The boron nitride thus obtained has a difficult sintering property and does not shape a sintered product by itself. Thus, for producing a sintered product of boron nitride, it is general to add a sintering aid to such a boron nitride powder and apply thereto a hot press and, for example, a method of adding a borate of an alkaline earth metal to boron nitride and hot-pressing the mixture is known as described in JP-B-49-40124.

For the production of a sintered material of a boron-nitride-containing complex material, a hot press method is applied. For example, a method of obtaining a BN-TiB$_2$-AlN three-component series container for metal vapor deposition by hot-pressing a mixed powder composed of titanium diborate, boron nitride, boroncarbide and metallic aluminum in vacuum is disclosed in JP-A-62-139866.

However, the hot-pressing method is problematic in that the production efficiency is poor and the method can be applied to a simple-shape part only and the industrial utilization of the method is limited. For example, it is very difficult to produce a long product such as a thermocouple protective tube of a boron-nitride-containing complex material.

Thus, a technique capable of normal-pressure sintering of these parts by using a complex material of boron nitride and other material(s) as such parts and also, at the same time, improving the sintering property thereof has been developed. For example, JP-A-61-132564 discloses a method of CIP melding a mixed powder of BN, Al$_2$O$_3$, and B$_2$O$_3$ and sintering the mixed powder in a non-oxidizing atmosphere at normal pressure. In this way normal-pressure sintering is applied to the boron-nitride-containing complex material capable of being normal-pressure sintered as described above, the fault (the low productivity and the restriction on the shape of the parts) in the hot press method can be avoided.

Also, a method wherein a phenol resin is added, as a binder, to a boron-nitride-containing material, the material is molded, and thereafter the material is bonded with residual carbon obtained by thermal decomposition is known. For example, JP-A-3-268849 discloses a method of adding from 8 to 15% by weight a liquid phenol resin to a mixed powder of boron nitride and partially stabilized zirconia followed by kneading and decomposing the phenol resin by sintering the kneaded product at a temperature of from 1,000° C. to 1,200° C. to obtain an immersion nozzle for continuous casting.

Now, as described above, for the hexagonal boron nitride material, the market expansion of the powder or the sintered product has been expected owing to its specific characteristics, and the practical use thereof has proceeded owing to the technology as described above but the market thereof has not progressed at present as expected. The main cause thereof is that the hexagonal boron nitride powder is expensive.

The reason that the hexagonal boron nitride powder is expensive is that since the purity of boron nitride as the product is low because borax and boron oxide as the raw materials are softened in the course of the reaction during which they become glassy, which hinders the nitriding, and also the nitriding and the crystallization cannot be simultaneously carried out. Therefor, for the production of the hexagonal boron nitride powder, many steps are required as described above and the production steps become troublesome.

Thus, a method of forming hexagonal boron nitride in the sintered product without using the expensive hexagonal boron nitride powder has been proposed. For example, JP-A-4-325461 disclosed that by molding a mixed powder of silicon and B$_4$C and heating the mixed powder in a nitrogen gas atmosphere, a sintered product containing BN and C formed by the nitriding of B$_4$C, SiC formed by the carbonization of silicon, and Si$_3$N$_4$ formed by the nitriding of silicon can be produced.

Also, JP-A-5-201771 discloses a method of forming a boron-nitride-containing sintered product by reaction sintering. Practically, using at least one material selected from the group consisting of silicon, $SiB_4$, $SiB_6$, $AlB_2$, $AlB_{12}$, $CaB_6$, silicon oxide, and alumina as the starting powders, a molding having a shape resembling the final shape is obtained by casting and the molding is nitrided for from 5 to 100 hours, at a temperature of from 1,000° C. to 1,400° C., and a nitrogen gas pressure of from 500 to 1,000 mbar or is nitrided for from 1 to 20 hours at a nitrogen gas pressure of from 2 to 20 bar. By forming $Si_3N_4$ from silicon and forming a nitride of an element bonded to boron and BN from the boride ($SiB_6$ shapes $Si_3N_4$ and BN, and $AlB_{12}$ shapes AlN and BN) in the nitriding step, $Si_3N_4$, BN, and AlN are formed. After the nitriding step, by sintering the products formed in the temperature range of from 1,500° C. to 1,900° C., β'-sialon is formed from $Si_3N_4$, AlN, and previously added $Al_2O_3$ is formed and silicon oxynitride ($Si_2N_2O$) is formed from $Si_3N_4$ and previously added $SiO_2$, whereby a sintered product composed of β'-sialon, acid silicon nitride, and boron nitride as the main components is obtained. In this ease, it is described that, the carbon content of the boride is preferably required to be 0.1% or less and also $B_4C$ is excluded from the objects. Also, it is described that oxide(s) such as alumina, silicon dioxide, mullite, zirconia, yttrium oxide, YAG (yttrium-aluminum garnet $3Y_2O_3·5Al_2O_3$), calcium oxide, and magnesium oxide may be added to the starting materials, but $B_2O_3$ must not be present. Also, it is limited that these oxide additives are not reacted with the remaining starting powders in the nitriding step and during the sintering treatment.

Both JP-A-4-325461 and JP-A-5-201771 disclose that a sintered product of the complex material containing silicon nitride and boron nitride is obtained by the nitriding of silicon and the boride(s) as described above.

Also, it is known that the powders are formed prior to the nitriding step as described in the patent publications mentioned above and, in particular, it is described in the latter that a shaped material having a shape resembling the final shape is formed by casting the mixture of the starting materials and then applying nitriding to the shaped product.

As described above, the market expansion of the hexagonal boron nitride material is expected as the powder or the sintered product thereof owing to the specific characteristics of the material but the market thereof has not expanded as expected by reason that the hexagonal boron nitride powder is expensive.

In regard to the problem, as to the sintered product, a method of using a boride powder in place of the hexagonal boron nitride powder as a raw material and forming a hexagonal boron nitride by the nitriding of a molding containing the boride powder to produce a complex material containing boron nitride is proposed in JP-A-4-325461 and JP-A-5-201771 as described above, and if an inexpensive boride is obtained, the method leads the solving of the cost problem described above.

However, the method is applied to a limited composition system only to obtain the sintered material of the complex material containing silicon nitride and boron nitride by the nitriding of metallic silicon and a boride and does not project the various possibilities of a boron-nitride-containing complex material.

Also, when various reactions given in JP-A-4-325461 and JP-A-5-201771 are carried out, a problem occurs in that the product exhibits a volume increase of from 20 to 80%. That is, as described in the patent publications, when the starting materials are molded and the foregoing reaction is performed on to the molding in the state of the free surface thereof, the molding is expanded and deformed and in this step, cracks occur in many cases. Accordingly, it is difficult to obtain a sintered product capable of being used practically as it is.

SUMMARY OF THE INVENTION

It is an object of the present invention to provide a method for producing a boron-nitride-containing material which is capable of obtaining the boron-nitride-containing material at a low cost and also to provide the boron-nitride-containing material obtained by the method.

To attain the aforementioned object, the present invention provides a method for producing boron nitride containing material comprising the steps of:

preparing a mixed powder including a boride and a first oxide, the boride consisting of boron and another element;

heating the mixed powder in a nitriding atmosphere to reduce the first oxide by said another element in the boride, to a boron nitride and at least one selected from the group consisting of a second oxide having less bonded oxygen than the first oxide, a oxynitride, a nitride and a boride, resulting in a boron nitride containing material.

Also, the present invention provides a boron nitride containing material produced by the aforementioned method.

Moreover, the present invention provides a method for producing boron nitride containing material comprising the steps of:

preparing a mixed powder including at least two borides; and heating the mixed powder in a nitriding atmosphere to produce a boron nitride and a compound which comprises elements bonding to boron in said at least two borides.

Also, the present invention provides a boron nitride containing material produced by the aforementioned method.

Furthermore, the present invention provides a method for producing boron nitride containing material comprising the steps of:

preparing a mixed powder including a boride and Al; and heating the mixed powder in a nitriding atmosphere to produce a boron nitride and AlN.

Also, the present invention provides a boron nitride containing material produced by the aforementioned method.

DESCRIPTION OF THE EMBODIMENT

Figure 1:
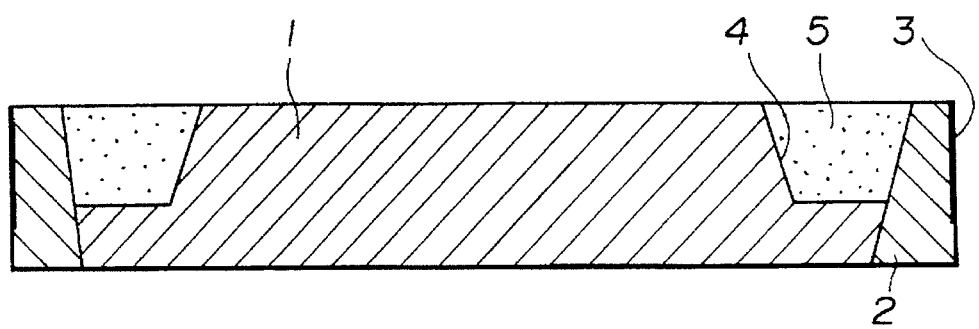
FIG. 1 is a cross-sectional view exhibiting a restrained mold used in a example of the present invention.

According to the 1st aspect of the present invention, provided is a method of producing a boron-nitride-containing material, which comprises heating a mixed powder of a boride and an oxide in a nitriding atmosphere, whereby a part or the whole of the oxide is reduced with an element bonded to the boron of the boride to convert the mixed powder to at least one kind of oxide having less bonded oxygen, an oxynitride, a nitride, a carbide, and a boride and also to shape boron nitride.

According to another aspect of the present invention, there is provided a boron nitride material which is a material obtained by heating a mixed powder containing a boride and an oxide in a nitriding atmosphere and containing at least an oxide having less bonded oxygen, an oxynitride, a nitride, a carbide, and boride together with boron nitride. In this case, boron nitride formed is noncrystalline or hexagonal.

The inventors previously proposed a method of producing a boron-nitride-containing inorganic material, which comprises nitriding a filled or formed product of an inorganic powder containing at least 20% a boride of at least one kind of an element belonging to Groups II to IV of the periodic table to convert at least 50% by weight of boride to the foregoing element or a nitride of the element (JP-A-7-048105). It is described that by utilizing a method of nitriding a boride, the sintered product of a boron nitride-containing material can be produced without using a sintering aid.

However, in order to ensure the production of a practically usable sintered material without causing expansion, deformation, or the formation of cracks by the method, it is inevitable to apply the hot press. However, as described above, the application of the hot press is limited to a simple shape in which hot pressing is applied in one direction. Also, the range of component systems to which it is applicable is broader than those shown in JP-A-4-325461 and JP-A-5-201771 but the applicable component systems are not yet sufficient.

As a result of various investigations conducted on such a point, the inventors have discovered that by selecting a proper temperature and by heating a starting material containing a boride and an oxide in a nitriding gas, such as a nitrogen gas, an ammonia gas, an ammonia decomposition gas, etc., or a mixed gas containing a nitriding gas, a part or the whole of the oxide is reduced with the element bonded to boron of the boride, whereby the starting material is converted to an oxide having less bonded oxygen, an oxynitride, nitride, carbide, or a boride and also noncrystalline or hexagonal boron nitride can be formed.

The present invention has been accomplished based on this knowledge, can be applied to very wide range of component systems, can ensure the production of a practically usable sintered product without causing expansion, deformation, or the formation of cracks without the use of a hot press, and can produce widely usable sintered products for parts of various shapes.

Now, the present invention will be specifically described. There is no particular restriction on the boride of the starting material but a boride having at least one of the elements belonging to Groups II to IV of the periodic table is preferred.

The boride of the element belonging to Group II of the periodic table includes, for example, $BeB_2$, $BeB_6$, $BeB_{12}$, $MgB_2$, $CaB_6$, $SrB_6$ and $BaB_6$.

The boride of the element belonging to Group III of the periodic table includes, for example, $AlB_2$, $AlB_{12}$, $ScB_2$, $YB_2$, $YB_6$, $YB_{12}$, $LnB_4$, and $LnB_{12}$ (wherein Ln is lanthanoid).

The boride of the element belonging to Group IV of the periodic table includes, for example, $B_4C$, $B_{12}C_{12}$, $SiB_4$, $SiB_6$, $SiB_{12}$, $TiB_2$, $ZrB_2$, $HfB_2$, $ThB_4$, and $ThB_6$.

The boride of the element belonging to Group V of the periodic table includes, for example, $VB$, $VB_2$, $NbB_2$, $TaB$, and $TaB_2$.

The boride of the element belonging to Group VI of the periodic table includes, for example, $CrB$, $CrB_2$, $MoB$, $MOB_2$, $WB$, $W_2B_5$, $WB_4$, $UB_4$, and $UB_{12}$.

Also, the boride of the starting material for use in the present invention is more preferably one or more kinds of the borides selected from $MgB_2$, $CaB_6$, $AlB_2$, $AlB_{12}$, $TiB_2$, $ZrB_2$, and $B_4C$.

There is no particular restriction on the oxide of the starting material, an oxide of one or more of the elements belonging to Groups II to VI of the periodic table is preferred.

The oxide of the element belonging to group II of the periodic table includes, for example, $BeO$, $MgO$, $CaO$, $SrO$, $SrO_2$, $BaO$, and $BaO_2$.

Oxides of the elements belonging to Group III of the periodic table include, for example, $Al_2O_3$, $Sc_2O_3$, $Y_2O_3$, $CeO_2$, $La_2O_3$, $Pr_6O_{11}$, $Nd_2O_3$, $Sm_2O_3$, $Eu_2O_3$, and $Gd_2O_3$.

Oxides of the elements belonging to Group IV of the periodic table include, for example, $B_2O_3$, $SiO_2$, $TiO$, $Ti_2O_5$, $TiO_2$, $ZrO_2$, $HfO_2$, and $ThO_2$.

Oxides of the elements belonging to Group V of the periodic table includes, for example, $VO$, $V_2O_3$, $VO_2$, $NbO$, $NbO_2$, $Nb_2O_5$, $Ta_2O_5$.

Oxides of the elements belonging to Group VI of the periodic table include, for example, $Cr_2O_3$, $MoO_2$, $WO_2$, $W_3O_8$, $WO_3$, and $UO_2$.

Also, the oxide of the starting material to be used in the present invention is more preferably one or more kinds of the oxides selected from $TiO_2$, $ZrO_2$, $Cr_2O_3$, $B_2O_3$, $Al_2O_3$, and $SiO_2$.

Also, the oxide of the starting material to be used in the present invention may be a complex oxide. Examples of the complex oxide are $Al_2O_3 \cdot P_2O_5$, $3Al_2O_3 \cdot 2SiO_2$, $Al_2O_3 \cdot TiO_2$, $Al_2O_3 \cdot 2TiO_2$, $BaO \cdot Al_2O_3$, $BaO_6 \cdot Al_2O_3$, $BaO \cdot Al_2O_3 \cdot 2SiO_2$, $2BaO \cdot SiO_2$, $BaO \cdot ZrO_2$, $BeO \cdot Al_2O_3$, $BeO \cdot SiO_2$, $2BeO \cdot SiO_2$, $3BeO \cdot TiO_2$, $3BeO \cdot 2ZrO_2$, $3CaO_5 \cdot Al_2O_3$, $CaO \cdot CrO_3$, $CaO \cdot Cr_2O_3$, $CaO \cdot HfO_2$, $3CaO \cdot P_2O_5$, $4CaO \cdot P_2O_5$, $3CaO \cdot SiO_2$, $2CaO \cdot SiO_2$, $5CaO \cdot SiO_2 \cdot P_2O_5$, $CaO \cdot TiO_2$, $2CaO \cdot TiO_2$, $3CaO \cdot TiO_2$, $CaO \cdot ZrO_2$, $CoO \cdot Al_2O_3$, $FeO \cdot Cr_2O_3$, $MgO \cdot Al_2O_3$, $MgO \cdot Cr_2O_3$, $MgO \cdot Fe_2O_3$, $MgO \cdot La_2O_3$, $2MgO \cdot SiO_2$, $2MgO \cdot TiO_2$, $MgO \cdot ZrO_2$, $MgO \cdot ZrO_2 \cdot SiO_2$, $NiO \cdot Al_2O_3$, $K_2O \cdot Al_2O_3 \cdot 2SiO_2$, $SrO \cdot Al_2O_3$, $3SrO \cdot P_2O_5$, $SrO \cdot ZrO_2$, $ThO_2 \cdot ZrO_2$, $ZnO \cdot al_2O_3$, $ZnO \cdot ZrO_2 \cdot SiO_2$, and $ZrO_2 \cdot SiO_2$.

In the foregoing complex oxides, the complex oxide containing one or more kinds of the oxides selected from $TiO_2$, $ZrO_2$, $Cr_2O_3$, $B_2O_3$, $Al_2O_3$, and $SiO_2$ is more preferred.

Bauxite, pyrophyllite, and kaolinite each composed of $Al_2O_3$ and $SiO_2$ as the main components, zircon sand composed of $ZrO_2 \cdot SiO_2$ as the main component, a baddeleyite ore composed of $ZrO_2$ as the main component, etc., can be also used as a complex oxides to be used in the present invention.

Also, a part or the whole of the oxide of the starting material may be replaced with an oxide precursor, which is converted into an oxide by being thermally decomposed. Examples of the precursor are hydroxides such as $Al(HO)_3$, $H_3BO_3$, etc., alkoxides such as $[(CH_3)2CHO]_3Al$, etc., organic acid salts such as $Al[CH_3CH(OH)COO]_3$, etc., and inorganic acid salts such as $Al(NO_3) \cdot 9H_2O$, etc., and a part or the whole of $Al_2O_3$ can be replaced with the foregoing precursors.

In the present invention, the oxide is reduced with the element bonded to boron of the boride to make one or more kinds of an oxide having less bonded oxygen, an oxynitride, a nitride, a carbide, and boride and also to shape boron nitride. An example of the reaction of reducing the oxide with the element bonded to boron of the boride to convert it into an oxynitride and to shape boron nitride is as follows.

$CaB_6+2ZrO_2+3N_2 \rightarrow CaZrO_3+ZrO+6BN$.

Examples of the reaction of reducing the oxide with the element bonded to boron of the boride to make an oxynitride and to shape boron nitride are as follows.

$3CAB_6+3SiO_2+10N_2 \rightarrow 3CaO \cdot SiO_2+Si_2N_2O+18BN$, $6AlB_2+3SiO_2+9N_2 \rightarrow 2Al_2O_3N+Si_3N_4+12BN$, $6AlB_{12}+3SiO_2+39N_2 \rightarrow 2Al_2O_3N+Si_3N_4+72Bn$, and $3B_4C+3Al_2O_3+7N_2 \rightarrow 2Al_2O_3N+12BN+3CO$.

Examples of the reaction of reducing the oxide with the element bonded to boron of the boride to make a nitride and to shape boron nitride are as follows.

$4AlB_2+3SiO_2+6N_2 \rightarrow 2Al_2O_3+Si_3N_4+8BN$, $4AlB_{12}+3SiO_2+14N_2 \rightarrow 2Al_2O_3+Si_3N_4+24BN$, $3CaB_6+B_2O_3+10N_2 \rightarrow 3CaO+20BN$, $6MgB_2+3SiO_2+8N_2 \rightarrow 6MgO+Si_3N_4+12BN$, $3TiB_2+3SiO_2+5N_2 \rightarrow 3TiO_2+Si_3N_4+6BN$, $3ZrB_2+3SiO_2+5N_2 \rightarrow 3ZrO_2+Si_3N_4+6BN$, $6B_4C+3SiO_3+14N_2 \rightarrow Si_3N_4+24BN+6CO$, $3B_4C+Al_2O_3+7N_2 \rightarrow 2AlN+12BN+3CO$, $4B_4C+2TiO_2+9N_2 \rightarrow 2TiN+16BN+4CO$, $4B_4C+2ZiO_2+9N_2 \rightarrow 2ZiN+16BN+4CO$, and $3B_4C+B_2O_3+7N_2 \rightarrow 14BN+3CO$.

Examples of the reaction of reducing the oxide with the element bonded to boron of the boride to make a carbide and to shape boron nitride are as follows.

$3B_4C+SiO_2+6N_2 \rightarrow SiC+12BN+2CO$ and $13B_4C+3Cr_2O_3+26N_2 \rightarrow 2Cr_3C_2+52BN+9CO$.

Examples of the reaction of reducing the oxide with the element bonded to boron of the boride to make a boride and also to shape boron nitride are as follows.

$2CaB_6+ZrO_2+5N_2 \rightarrow 2CaO+ZrB_2+10BN$ and $2B_4C+ZrO_2+3N_2 \rightarrow ZrB_2+6BN+2CO$.

Examples of the reaction for reducing the complex oxide with the element bonded to boron of the boride to make a carbide, a nitride, and a boride and also to shape boron nitride are the following combination of mullite $(3Al_2O_3 \cdot 2SiO_2)$, zircon $(ZrO_2 \cdot SiO_2)$, and a boride.

$15B_4C+3Al_2O_3 \cdot 2SiO_2+33N_2 \rightarrow 6AlN+2SiC+60BN+13CO$, $6B_4C+3Al_2O_3 \cdot 2SiO_2+12N_2 \rightarrow 3Al_2O_3+2SiC+24BN+4CO$, $4B_4C+3Al_2O_3 \cdot 2SiO_2+(28/3)N_2 \rightarrow 3Al_2O_3+(2/3)Si_3N_4+16BN+4CO$, $5B_4C+ZrO_2 \cdot SiO_2+9N_2 \rightarrow ZrB_2+SiC+18BN+4CO$, and $4B_4C+ZrO_2 \cdot SiO_2+(59/3)N_2 \rightarrow ZrN+(2/3)Si_3N_4+16BN+4CO$.

In addition, since these reactions are accompanied by an endothermic reaction or an exothermic reaction, the temperature of the treated materials differs from the temperature of the atmosphere surrounding the treated material but the temperature shown below means the atmospheric temperature.

In the boron-nitride-containing material for use in the present invention, it is preferred that the content of boron nitride is from 5 to 100% by weight. This is because if the content thereof is less than 5% by weight, it is difficult to impart the characteristics of boron nitride described above to the boron-nitride-containing material. Also, as described above, $B_4C$ is selected as the boride, $B_2O_3$ is selected as the oxide, and by reacting $B_4C$ and $B_2O_3$ in a nitriding atmosphere to remove oxygen in the shape of CO, BN of substantially 100% by weight can be formed.

In the case of BN is formed in the reaction of $B_4C$ and $B_2O_3$, the reaction temperature is preferably from 1,100° C. to 1,400° C. This is because if the reaction temperature is lower than 1,100° C., the reaction is greatly delayed while, on the other hand, if the temperature is higher than 1,400° C., the loss of $B_2O_3$ by evaporation becomes large.

Also, the formed material is a material obtained by heating a mixed powder containing at least from 50 to 90% by weight of $B_4C$ and from 10 to 50% by weight $B_2O_3$ or $H_3BO_3$ to a temperature of from 1,100° C. to 1,400° C. in a nitriding atmosphere and it is more preferred that the maximum peak detected by an X-ray diffraction analysis is BN. This is because boron nitride which readily undergoes crystallization exhibits well the characteristics of boron nitride.

By disintegrating the porous boron-nitride-containing material produced by each of the various reactions described above by means of a hammer mill, a jaw crusher, a vessel-rotating ball mill, an epicyclic ball mill, a vibration ball mill, a stirrer-containing ball mill, etc., the powder thereof can be easily obtained. Since boron nitride formed by the reaction described above imparts to the material the property of being disintegrated, the powder of the boron-nitride containing material can be economically obtained by the method described above. The porosity of the foregoing porous material is preferably from 10 to 70%, and more preferably from 50 to 70%. The reason is that as the higher the porosity is, the easier crushing is made, while if the porosity is too high, the productivity in the nitriding step is reduced.

When the various kinds of reactions described above are practiced, the products exhibit a volume increase of from 20 to 80%.

When the starting material is molded by a known means to first give it the shape and the foregoing reaction is applied to the molding in the state of the free surface thereof, the molding is expanded and deformed. Also, in many cases, cracks occur in this step. Accordingly, it is difficult to use the sintered product as a part as it is.

This problem is solved by packing the mixed powder containing the boride in a heat-resistant mold, if necessary, applying a load to the packing to make the packing ratio 30 to 70%, also, if necessary, closing the packing openings to substantially control the shape of the packing with the heat-resistant mold, disposing the heat sensitive mold in a furnace, and heating the packing in a nitriding atmosphere to convert the content to the sintered product of the boron-nitride-containing material. The advantages obtained by using the heat-resistant mold are that a sintered product without cracks is obtained, the molding step can be omitted, since the shape of the final product or a shape resembling the final shape is obtained, a post-working for setting the shape of the final product can be omitted or greatly reduced, mass production is possible by disposing many heat-resistant molds in the furnace different from a hot press for producing a single product having a simple shape, and a product having a complicated shape can be produced.

In this case, it is preferred that the heat-resistant mold is composed of a material containing at least 80% by weight of graphite or hexagonal boron nitride. This is because both of the materials are thermally stable and reluctantly react with nitrogen at the temperature range suitable for the foregoing reaction and such an effect is obtained by containing at least 80% by weight of the foregoing material.

Also, the reason for defining the packing ratio of the mixed powder to 30 to 70% is that if the packing ratio is less than 30%, even with the volume increase with the nitriding reaction, it is difficult to obtain a bulk density capable of ensuring sufficient strength, while if the packing ratio is over 70%, the porosity is reduced by the volume increase with the nitriding reaction to clog the passageways for entering a gas, whereby the progress of the reaction becomes insufficient, the heat-resistant mold is damaged by the excessive volume increase, and also the dissolution of the heat-resistant mold becomes impossible.

Then, various kinds of boron-nitride-containing materials useful as the sintered materials in the various kinds of the nitriding reactions will be explained.

Firstly, one of the useful boron-nitride-containing material is the material obtained by heating a starting material containing at least from 1 to 15% by weight $CaB_6$, from 50 to 80% by weight $B_4C$, and from 10 to 50% by weight $B_2O_3$ or $H_3BO_3$ to a temperature of from 1,100° C. to 1,400° C. in a nitriding atmosphere and is the boron-nitride-containing material wherein the maximum peak detected through X-ray diffraction is BN. In the component system, CaO formed functions as a sintering aid, whereby the sintering of boron nitride, which is known to have a limited sintering property, becomes possible. In the case of forming BN by the reaction of $B_4C$ and $B_2O_3$, it is preferred that the reaction temperature is from 1,100° to 1,400° C. as described above. If the reaction temperature is lower than 1,100° C., the reaction is greatly delayed, while the reaction temperature is higher than 1,400° C., the loss of $B_2O_3$ by evaporation becomes large. Also, in the boron-nitride containing material obtained by heating the mixed powder containing at least from 50 to 80% by weight $B_4C$ and from 10 to 50% by weight $B_2O_3$ or $H_3BO_3$ to a temperature of from 1,100° C. to 1,400° C. in a nitriding atmosphere, the maximum peak detected through X-ray diffraction is BN. This is because boron nitride having thus proceeded crystallization exhibits well the characteristics of boron nitride as described above.

Secondly, other useful boron-nitride-containing material is the material obtained by heating a mixed powder containing at least from 5 to 60% by weight $CaB_6$ and from 40 to 95% by weight $ZrO_2$ to a temperature of from 1,000° C. to 1,500° C. in a nitriding atmosphere, and is the boron-nitride-containing material, wherein the material contains at least a complex oxide of CaO and $ZrO_2$ or cubic $ZrO_2$, $ZrB_2$, and BN, and the ratio of the sum of the height of the peak of Zr and the height of the peak of Ca to the height of the peak of B obtained by EDX (energy dispersion-type X-ray analysis) is in the range of from 0.02 to 9. Whether or not the boron-nitride-containing material contains the complex oxide of CaO and $ZrO_2$ or cubic $ZrO_2$, $ZrB_2$, and BN can be confirmed through detection of the diffraction peaks corresponding to these by X-ray diffraction.

Pure $ZrO_2$ is faulty in that when if is heated, it causes a phase transformation from the monoclinic system to the tetragonal system at a temperature of from 1,000° C. to 1,100° C. and at cooling, the contrary phase transformation occurs to cause self-disintegration. However, in the foregoing component system, formed CaO shapes a solid solution with $ZrO_2$ to shape a complex oxide of CaO and $ZrO_2$ and the component system can be converted to a stable cubic system which does not cause a phase transformation when a part or all of $ZrO_2$ is heated. It is known that both $ZrB_2$ and $ZrO_2$ are each excellent in corrosion resistance to metal, in particular, iron. In the material of the present invention, the advantage of BN is further added to the advantage of $ZrB_2$ and $ZrO_2$ and thus the material of the present invention is a unique high corrosion resistant material to which a machining can be applied.

However, if the content of $CaB_6$ is less than 5% by weight or the content of $ZrO_2$ is more than 95% by weight, the stabilization of $ZrO_2$ in the sintered product is insufficient. Also, if the content of $CaB_6$ is more than 60% by weight or the content of $ZrO_2$ is less than 40% by weight, the content of Ca becomes excessive and $Ca_3N_2$ is formed in the step of the nitriding, which is undesirable since $Ca_3N_2$ reacts with the moisture in the air to release ammonia and also expands leading to the collapse of the sintered product.

Also, if the heating temperature is lower than 1,000° C., the reaction of $CaB_6$ and $ZrO_2$ does not occur, while if the heating temperature is higher than 1,500° C., the formation of $ZrB_2$ becomes difficult; both are undesirable. The composition of the complex oxide of CaO and $ZrO_2$ formed differs according to the amount ratio of the raw materials but examples of the composition thereof are $CaO \cdot ZrO_2$ and $3CaO \cdot 17ZrO_2$. When the amount of $CaB_6$ is small, a complex oxide is not formed and CaO shapes a solid solution with $ZrO_2$ to shape cubic $ZrO_2$ which does not cause a phase transformation but either complex oxide or cubic $ZrO_2$ may be formed. To obtain an oxide and $ZrB_2$ high corrosion resistance and boron nitride with excellent machining property, it is desirable that the ratio of the sum of the heights of the peaks of Zr and Ca (as a numerator) to the height of the peak of B (as a denominator) obtained by energy dispersion type X-ray analysis (EDX) is in the range of from 0.02 to 9. If the ratio is less than 0.02, the characteristics of the oxide and $ZrB_2$ become insufficient, while if the content is larger than 9, the characteristics of boron nitride become insufficient.

Thirdly, still another useful boron-nitride-containing material of the present invention is the material obtained by heating a mixed powder containing at least from 5 to 60% by weight $CaB_6$ and from 40 to 95% by weight $ZrO_2$ to a temperature of from 1,300° C. to 1,900° C. in a nitriding atmosphere and is the boron-nitride-containing material, wherein the material contains at least the complex oxide of CaO and $ZrO_2$ or cubic $ZrO_2$, ZrO, and BN and the ratio of the sum of the heights of the peaks of Zr and Ca to the height of the peak of B obtained by EDX is in the range of from 0.02 to 9. Whether or not the boron-nitride-containing material contains the complex oxide of CaO and $ZrO_2$ or cubic $ZrO_2$, ZrO, and BN can be confirmed through the detection of the diffraction peaks corresponding to them using X-ray diffraction.

In the boron-nitride-containing material, the material also becomes a stable cubic system by the formation of the solid solution of CaO with $ZrO_2$ or the formation of the complex oxide of CaO and $ZrO_2$ and the occurrence of self-disintegration with the transformation of $ZrO_2$ can be avoided. Also, the material having the characteristics of cubic $ZrO_2$, the complex oxide of CaO and $ZrO_2$, and ZrO each having corrosion resistance, in particular, a high corrosion resistance to molten metals and molten slags and also the characteristics of BN having an excellent machining property is obtained.

Also, as in the ease of the boron nitride material described above, if the content of $CaB_6$ is less than 5% by weight or the content of $ZrO_2$ is more than 95% by weight, the stabilization of $ZrO_2$ in the sintered product is insufficient. Also, if the content of $CaB_6$ is more than 60% by weight or the content of $ZrO_2$ is less than 40% by weight, the content of Ca becomes excessive and $Ca_3N_2$ is formed in the step of the nitriding, which is undesirable since $Ca_3N_2$ reacts with the moisture in the air to release ammonia and also expands leading to collapse of the sintered product.

If the heating temperature is lower than 1,300° C., the formation of ZrO becomes difficult. Also, if the heating temperature is higher than 1,900° C., the loss of the starting materials with their evaporation becomes undesirably large. The composition of the complex oxide of CaO and $ZrO_2$ formed differs according to the amount ratio of the raw materials but examples of the composition are $CaO \cdot ZrO_2$ and $3CaO \cdot 17ZrO_2$ as in the case of the boron-nitride-containing material described above. If the amount of $CaB_6$ is small, the complex oxide is not formed and CaO shapes a solid solution with $ZrO_2$ to shape cubic $ZrO_2$ which does not cause a phase transformation, and in this case, either of the complex oxide or cubic $ZrO_2$ may be formed.

For having both the high corrosion resistance of such an oxide and ZrO and the excellent machining property of boron nitride, it is desirable that the ratio of the sum of the heights of the peaks of Zr and Ca (as a numerator) to the height of the peak of B (as a denominator) obtained by EDX is in the range of from 0.02 to 9. If the ratio is less than 0.02, the characteristics of the oxide becomes insufficient, while if the ratio is higher than 9, the characteristics of boron nitride becomes insufficient.

Fourthly, still further a useful boron-nitride-containing material is the material obtained by heating a mixed powder containing at least from 5 to 60% by weight $B_4C$ and from 40 to 95% by weight $ZrO_2$ to a temperature of from 1,000° C. to 1,500° C. in a nitriding atmosphere and is the boron nitride-containing material, wherein the material contains at least $ZrB_2$ and BN and the ratio of the height of the peak of Zr to the height of the peak of B obtained by EDX is in the range of from 0.02 to 9. Whether or not the material contains $ZrB_2$ and BN can be confirmed through detection of the diffraction peaks corresponding to them using X-ray diffraction.

The boron-nitride-containing material is also a unique material having beth characteristics of $ZrO_2$ having a high corrosion resistance and the characteristics of BN having an excellent machining property. In this case, the total amount of $ZrO_2$ of the starting materials may be converted to $ZrB_2$ or a part of $ZrO_2$ is converted to $ZrB_2$ and unreacted $ZrO_2$ my be left. If the content of $B_4C$ is less than 5% by weight or the content of $ZrO_2$ is more than 95% by weight, the formation of $ZrB_2$ becomes too small, whereby the high corrosion resistance of $ZrB_2$ is not sufficiently obtained, and the formation of BN becomes too small. Also, the amount of unreacted $ZrO_2$ becomes excessive, the self-disintegration by the phase transformation cannot be undesirably softened. If the content of $B_4C$ becomes more than 60% by weight or the content of $ZrO_2$ is less than 40% by weight, the amount of BN formed becomes excessive, leading an undesirable lowering of the strength of the material.

Also, if the heating temperature is lower than 1,000° C., the reaction of $B_4C$ and $ZrO_2$ does not occur. Also, if the heating temperature is higher than 1,500° C., the formation of $ZrB_2$ becomes undesirably difficult.

To obtain both the high corrosion resistance of the oxide and $ZrB_2$ and the excellent machining property of boron nitride, it is desirable that the ratio of the height of the peak of Zr (as a numerator) to the height of the peak of B (as a denominator) is in the range of from 0.02 to 9. If the ratio is less than 0.02, the characteristics of the oxide and $ZrB_2$ become insufficient, while if the ratio is higher than 9, the characteristics of boron nitride become insufficient; both are undesirable.

Fifthly, another useful boron nitride material of the present invention is the material obtained by heating a mixed powder containing at least from 5 to 60% by weight of $B_4C$ and from 40 to 95% by weight of $ZrO_2$ to a temperature of from 1,300° C. to 1,900° C. in a nitriding atmosphere, and is the boron nitride-containing material, wherein the material contains at least ZrN and BN and the ratio of the height of the peak of Zr to the height of the peak of B obtained by EDX is in the range of from 0.02 to 9. Whether or not the material contains ZrN and BN can be confirmed through detection of the diffraction peaks corresponding to them using X-ray diffraction.

The boron-nitride-containing material is a unique material having both the characteristics of ZrN having a high melting point and an electric conductivity and the characteristics of BN having an excellent machining property. In this case, the total amount of $ZrO_2$ of the starting materials may be converted to ZrN or a part of $ZrO_2$ is converted to ZrN and unreacted $ZrO_2$ may be left.

However, if the content of $B_4C$ is less than 5% by weight or the content of $ZrO_2$ is more than 95% by weight, the formation of ZrN becomes too small, whereby the characteristics of ZrN are not sufficiently obtained, and also the formation of BN becomes too small. Also, the amount of unreacted $ZrO_2$ becomes excessive, whereby the self-disintegration by the phase transformation cannot be undesirably softened. Also, if the content of $B_4C$ is more than 60 by weight or the content of $ZrO_2$ is less than 40% by weight, the amount of BN formed becomes excessive which undesirably lowers the strength of the material.

If the heating temperature is lower than 1,300° C., ZrN is not formed. Also, if the heating temperature is higher than 1,900° C., the loss of the starting materials through evaporation becomes undesirably large.

To obtain both the electrical conductivity of ZrN and the excellent machining property of boron nitride, it is desirable that the ratio of the height of the peak of Zr (as a numerator) to the height of the peak of B (as a denominator) obtained by EDX is in the range of from 0.02 to 9. If the ratio is less than 0.02, the characteristics of ZrN become insufficient and if the ratio is higher than 9, the characteristics of boron nitride become insufficient; both are undesirable.

Sixthly, still another useful boron-nitride-containing material of the present invention is a material obtained by heating a mixed powder containing at least from 1 to 5% by weight $CaB_6$, from 10 to 50% by weight $B_4C$, and from 15 to 90% by weight $ZrO_2$ to a temperature of from 1,300° C. to 1,900° C. in a nitriding atmosphere, and is the boron-nitride-containing material, wherein the material contains at least the complex oxide of CaO and $ZrO_2$ or cubic $ZrO_2$ and BN and the ratio of the sum of the heights of the peaks of Zr and Ca to the height of the peak of B obtained by EDX is in the range of from 0.02 to 9. Whether or not the material contains the complex oxide of CaO and $ZrO_2$ or cubic $ZrO_2$ and BN can be confirmed through detection of the diffraction peaks corresponding to them using X-ray diffraction.

In this case, $B_4C$ and $ZrO_2$ are the main reaction materials but by adding a small amount (1 to 5% by weight) of $CaB_6$, CaO is formed, whereby sintering can be accelerated and a high strength can be obtained as compared with the case in which no such additive is added. To obtain such an effect, it is necessary to add at least 1% by weight of $CaB_6$ but if the amount of $CaB_6$ is more than 5% by weight, the improvement of the effect is small. Accordingly, the addition of from 1 to 5% by weight of $CaB_6$ is preferred.

To obtain both the high corrosion resistance of the oxide and the excellent machining property of boron nitride, it is desirable that the ratio of the height of the peak of Zr (as a numerator) to the height of the peak of B (as a denominator) obtained by EDX is in the range of from 0.02 to 9. That is, if the ratio is less than 0.02, the characteristics of the oxide and $ZrO_2$ become insufficient, while if the ratio is higher than 9, the characteristics of boron nitride become insufficient; both are undesirable.

Seventhly, another useful boron-nitride-containing material of the present invention is the material obtained by heating a mixed powder containing at least from 5 to 60% by weight $CaB_6$, from 5 to 90% by weight $Al_2O_3$, and from 5 to 90% by weight $ZrO_2$ to a temperature of from 1,000° C. to 1,900° C. in a nitriding atmosphere, and is the boron-nitride-containing material, wherein the material contains at least the complex oxide of CaO and $Al_2O_3$, $ZrB_2$, and BN. Whether or not the material contains the complex oxide of CaO and $Al_2O_3$, $ZrB_2$, and BN can be confirmed through detection of the diffraction peaks corresponding to them using X-ray diffraction.

In this case, since $ZrB_2$ is particularly excellent in molten steel resistance, the formation thereof is preferred but unreacted $ZrO_2$ which has not been converted to $ZrB_2$ may remain. Also, cubic $ZrO_2$ which has formed a solid solution with CaO may be formed. This is because they are all excellent in the corrosion resistance, in particular, the molten steel resistance. A part of $Al_2O_3$ may remain as $Al_2O_3$ or may shape a complex oxide with CaO, or may shape AlN and AlON. This is because they are excellent in corrosion resistance, in particular, molten steel resistance. However, for the formation of AlN and AlON, a temperature of 1,800° C., and preferably higher than 1,900° C. is necessary and at such a high temperature, $ZrB_2$ is not formed.

To obtain a high corrosion resistance, it is sufficient that at least the complex oxide of $ZrB_2$, CaO, and $Al_2O_3$ co-exist and for realizing the co-existence of such complex oxides, the heating temperature is preferably in the range of from 1,000° C. to 1,900° C. Also, to obtain such characteristics, the contents of $Al_2O_3$ and $ZrO_2$ of the starting material each may be in the range of from 5 to 90% by eight. Further, if the content of $CaB_6$ is less than 5% by weight, the formed amount of BN is insufficient and thus it becomes difficult to obtain the characteristics of BN. Also, if the content of $CaB_6$ is more than 60% by weight, $Ca_3N_2$ which is unstable in air is undesirably formed. In addition, the reason for limiting the ratio of the sum of the heights of the peaks of Zr and Ca to the height of the peak of B obtained by EDX is the same as the case of each material described above. And the same is applicable to those given herein-after.

Eighthly, still another useful boron-nitride-containing material of the present invention is the material obtained by heating a mixed powder containing at least from 5 to 60% by weight $CaB_6$ and from 40 to 95% by weight $ZrO_2$, wherein from 20 to 100% by weight $ZrO_2$ is a monoclinic $ZrO_2$ powder having particle sizes of from 10 to 44 µm, to a temperature of from 1,000° C. to 1,500° C. in a nitriding atmosphere, and it is the boron-nitride-containing material, wherein the material contains at least monoclinic $ZrO_2$, a complex oxide of CaO and $ZrO_2$, $ZrB_2$, and BN, and the ratio of the sum of the heights of the peaks of Zr and Ca to the height of the peak of B obtained by EDX is in the range of from 0.02 to 9. Whether or not the material contains monoclinic $ZrO_2$, the complex oxide of CaO and $ZrO_2$, $ZrB_2$, and BN can be confirmed through detection of the diffraction peaks corresponding to them using X-ray diffraction.

As $ZrO_2$ of the starting materials, it is preferred that from 20 to 100% by weight thereof is a coarse monoclinic $ZrO_2$ powder having particle sizes of from 10 to 44 µm. This is because, a part of the coarse powders causes a reaction at a temperature of from 1,000° C. to 1,500° C. to be converted to a complex oxide of CaO and $ZrO_2$, $ZrB_2$, etc., but can leave unreacted $ZrO_2$. That is, the complex oxide of CaO and $ZrO_2$ is excellent in corrosion resistance but has the fault that depending on the condition contact, for example, molten steel or molten slag, the complex oxide is decomposed to release CaO, whereby the product becomes porous which lowers its strength. However, the fault is mitigated by leaving unreacted $ZrO_2$, which does not shape the solid solution with CaO, through the method described above. If the particle sizes of $ZrO_2$ of the starting materials are less than 10 µm, the reminder of the unreacted $ZrO_2$ is insufficient, whereby the foregoing effect is not obtained, while if the particle sizes are larger than 44 µm, the amount of unreacted $ZrO_2$ becomes excessive, the self-disintegration phenomenon through the modification of $ZrO_2$ becomes noticeable. Further also, if the content of coarse $ZrO_2$ of the starting material is less than 20% by weight, the remaining amount of unreacted $ZrO_2$ is insufficient and thus the foregoing effect is not obtained.

Ninthly, still another useful boron-nitride-containing material of the present invention is the material obtained by heating a mixed powder containing at least from 5 to 60% by weight $CaB_6$ and from 40 to 95% by weight $ZrO_2$, wherein from 20 to 100% by weight $ZrO_2$ is a monoclinic $ZrO_2$ powder having particle sizes of from 10 to 44 µm to a temperature of from 1,300° C. to 1,900° C. in a nitriding atmosphere, and is the boron-nitride-containing material, wherein the material contains at least monoclinic $ZrO_2$, a complex oxide of CaO and $ZrO_2$, ZrO or ZrN, and BN, and the ratio of the sum of the heights of the peaks of Zr and Ca to the height of the peak of B obtained by EDX is in the range of from 0.02 to 9. Whether the material contains monoclinic $ZrO_2$, the complex oxide of CaO and $ZrO_2$, ZrO or ZrN, and BN can be confirmed through detection of the diffraction peaks corresponding to them using the X-ray diffraction.

As $ZrO_2$ of the starting materials, it is preferred that from 20 to 100% by weight thereof is a coarse monoclinic $ZrO_2$ powder having particle sizes of from 10 to 44 µm. This is because, a part of the coarse powders causes a reaction at a temperature of from 1,300° C. to 1,900° C. to be converted to a complex oxide of CaO and $ZrO_2$, ZrO or ZrN, etc., but can leave unreacted $ZrO_2$. By using such a coarse monoclinic $ZrO_2$ powder and leaving unreacted $ZeO_2$, the molten steel resistance can be improved as in the case described above. If the particle sizes of $ZrO_2$ of the starting materials are less than 10 µm, the remaining amount of unreacted $ZrO_2$ is insufficient, whereby the foregoing effect is not obtained, while if the particle sizes are larger than 44 µm, the amount of unreacted $ZrO_2$ becomes excessive, the self-disintegration by the transformation of $ZrO_2$ becomes noticeable. Further also, if the content of coarse $ZrO_2$ of the starting material is less than 20% by weight, the remaining amount of unreacted $ZrO_2$ is insufficient and thus the foregoing effect is not obtained.

Tenthly, still other useful boron-nitride-containing material of the present invention is the material obtained by heating a mixed powder containing at least from 5 to 60% by weight $B_4C$ and from 40 to 95% by weight $ZrO_2$, wherein from 20 to 100% by weight $ZrO_2$ is a monoclinic $ZrO_2$ powder having particle sizes of from 10 to 44 µm, to a temperature of from 1,000° C. to 1,500° C. in a nitriding atmosphere; and it is the boron-nitride-containing material, wherein the material contains at least monoclinic $ZrO_2$, $ZrB_2$, and BN, and the ratio of the sum of the heights of the peaks of Zr and B to the height of the peak of B obtained by EDX is in the range of from 0.02 to 9. Whether or not the material contains monoclinic $ZrO_2$, $ZrB_2$, and BN can be confirmed through detection of the diffraction peaks corresponding to them using the X-ray diffraction.

As $ZrO_2$ of the starting materials, it is preferred that from 20 to 100% by weight thereof is a coarse monoclinic $ZrO_2$ powder having particle sizes of from 10 to 44 µm. This is because, a part of the coarse powders causes a reaction at a temperature of from 1,100° C. to 1,500° C. to be converted to $ZrB_2$, etc., but can leave unreacted $ZrO_2$. That is, $ZrB_2$ is excellent in molten steel resistance but is inferior to $ZrO_2$. However, by using such a coarse monoclinic $ZrO_2$ powder and leaving unreacted $ZrO_2$, the foregoing fault can be mitigated and molten steel resistance can be improved as in the case described above. The reason of limiting the particle sizes of $ZrO_2$ of the starting material is as described above. Also, if the content of coarse $ZrO_2$ of the starting materials is less than 20% by weight, the remaining amount of unreacted $ZrO_2$ is insufficient and the foregoing effect is not obtained.

Eleventhly, another useful boron-nitride-containing material of this invention is the material obtained by heating a mixed powder containing at least from 5 to 60% by weight of $B_4C$ and from 40 to 95% by weight of $ZrO_2$, wherein from 20 to 100% by weight $ZrO_2$ is a monoclinic system $ZrO_2$ powder having particle sizes of from 10 to 44 µm, to a temperature of from 1,300° C. to 1,900° C. in a nitriding atmosphere; and it is the boron-nitride-containing material, wherein the material contains at least monoclinic $ZrO_2$, ZrN, and BN, and the ratio of the height of the peak of Zr to the height of the peak of Ca obtained by EDX is in the range of from 0.02 to 9. Whether or not the material contains monoclinic $ZrO_2$, ZrN, and BN can be confirmed through detection of the diffraction peaks corresponding to them using the X-ray diffraction.

As $ZrO_2$ of the starting materials, it is preferred that from 20 to 100% by weight thereof is a coarse monoclinic $ZrO_2$ powder having particle sizes of from 10 to 44 µm. This is because, a part of the coarse powders causes a reaction at a temperature of from 1,300° C. to 1,900° C. to be converted to ZrN, etc., but can leave unreacted $ZrO_2$. That is, ZrN is inferior in corrosion resistance, in particular, in molten steel resistance and reacts with molten steel but using such a coarse monoclinic $ZrO_2$ powder and leaving unreacted $ZrO_2$ powder, the above-described fault is mitigated and the molten steel resistance can be improved as the ease described above. The reason for limiting the particle sizes of $ZrO_2$ of the starting materials is as described above. Also, if the content of coarse $ZrO_2$ of the starting material is less than 20% by weight, the remaining amount of unreacted $ZrO_2$ is insufficient and the foregoing effect is not obtained.

Twelfthly, another useful boron-nitride-containing material of this invention is the material obtained by heating a mixed powder containing at least from 1 to 5% by weight $CaB_6$, from 10 to 50% by weight $B_4C$ and from 15 to 90% by weight $ZrO_2$, wherein from 20 to 100% by weight $ZrO_2$ is a monoclinic $ZrO_2$ powder having particle sizes of from 10 to 44 µm, to a temperature of from 1,300° C. to 1,900° C. in a nitriding atmosphere, and it is the boron-nitride-containing material, wherein the material contains at least monoclinic $ZrO_2$, cubic $ZrO_2$, and BN, and the ratio of the sum of the heights of the peaks of Zr and Ca to the height of the peak of B obtained by EDX is in the range of from 0.02 to 9. Whether or not the material contains monoclinic $ZrO_2$, cubic $ZrO_2$, and BN can be confirmed through detection of the diffraction peaks corresponding to them using the X-ray diffraction.

As $ZrO_2$ of the starting materials, it is preferred that from 20 to 100% by weight thereof is a coarse monoclinic $ZrO_2$ powder having particle sizes of from 10 to 44 µm. This is because, a part of the coarse powders causes a reaction with $CaB_6$ at a temperature of from 1,300° C. to 1,900° C. to be converted to cubic $ZrO_2$, which shapes a solid solution with CaO, but can leave unreacted $ZrO_2$. That is, cubic $ZrO_2$ is excellent in corrosion resistance but has the fault that depending on the condition of being contacted with, for example, molten steel or molten slags, CaO forming a solid solution therewith is released to make the product porous, which lowers the strength of the product. However, by using such a coarse monoclinic $ZrO_2$ powder and leaving unreacted $ZrO_2$, the foregoing fault can be mitigated and molten steel resistance, etc., can be improved as the case described above. The reason for limiting the particle sizes of $ZrO_2$ of the starting material is as described above. Also, if the content of coarse $ZrO_2$ of the starting materials is less than 20% by weight, the remaining amount of unreacted $ZrO_2$ is insufficient and the foregoing effect is not obtained.

Thirteenthly, still another useful boron-nitride-containing material of this invention is the material obtained by heating a mixed powder containing at least from 5 to 60% by weight $CaB_6$, from 5 to 90% by weight $Al_2O_3$, and from 5 to 90% by weight $ZrO_2$, wherein from 20 to 100% by weight $ZrO_2$ is a monoclinic $ZrO_2$ powder having particle sizes of from 10 to 44 µm, to a temperature of from 1,300° C. to 1,900° C. in a nitriding atmosphere, and is the boron-nitride-containing material, wherein the material contains at least monoclinic $ZrO_2$, cubic $ZrO_2$ or a complex oxide of CaO and $ZrO_2$, $ZrB_2$, a complex oxide of CaO and $Al_2O_3$, and BN. Whether or not the material contains monoclinic $ZrO_2$, cubic $ZrO_2$ or the complex oxide of CaO and $ZrO_2$, $ZrB_2$, the complex oxide of CaO and $Al_2O_3$, and BN can be confirmed through detection of the diffraction peaks corresponding to them using the X-ray diffraction.

As $ZrO_2$ of the starting materials, it is preferred that from 20 to 100% by weight thereof is a coarse monoclinic $ZrO_2$ powder having particle sizes of from 10 to 44 µm. This is because, a part of the coarse powders causes a reaction with $CaB_6$ at a temperature of from 1,300° C. to 1,900° C. to be converted to cubic $ZrO_2$, which shapes a solid solution with CaO, or the complex oxide of CaO and $ZrO_2$ but can leave unreacted $ZrO_2$. That is, cubic $ZrO_2$ is excellent in corrosion resistance but has the fault that depending on the condition of being contacted with, for example, molten steel or molten slags, CaO forming a solid solution therewith is released to make the product porous which lowers the strength of the product. Also, the complex oxide of CaO and $ZrO_2$ is excellent in the corrosion resistance but has the fault that when the complex oxide is brought into contact with molten steel on a molten slag, the complex oxide is decomposed to release CaO, which makes the product porous to lower the strength thereof. However, the fault can be mitigated by the method described above since unreacted $ZrO_2$ can be left. The reason for limiting the particle sizes of $ZrO_2$ of the starting material is as described above. Further also, if the content of coarse $ZrO_2$ of the starting materials is less than 20% by weight, the remaining amount of unreacted $ZrO_2$ is insufficient and the foregoing effect is not obtained.

Also, the complex oxide of CaO and $Al_2O_3$ co-existing is not only very excellent in corrosion resistance but also accelerates sintering of the material and increases the strength of the material. However, if the content of CaO is excessive, the melting point of the complex oxide is lowered to hinder the use of the material at a high temperature. As described above, there is an appropriate range in the compounding ratios of the raw materials. That is, a mixed powder containing at least from 5 to 60% by weight of $CaB_6$, from 5 to 90% by weight of $Al_2O_3$, and from 5 to 90% by weight $ZrO_2$ is preferably used.

Fourteenthly, another useful boron-nitride-containing material of this invention is the material obtained by heating a mixed powder containing at least from 5 to 60% by weight $CaB_6$ and from 5 to 95% by weight $Al_2O_3$ to a temperature of from 1,300° C. to 1,900° C. in a nitriding atmosphere, and is the boron-nitride-containing material, wherein the material contains at least a complex oxide of CaO and $Al_2O_3$ and BN. Whether or not the material contains the complex oxide of CaO and $Al_2O_3$ and BN can be confirmed through detection of the diffraction peaks corresponding to them using the X-ray diffraction.

The complex oxide of CaO and $Al_2O_3$, e.g., $CaO \cdot 2Al_2O_3$ is not only very excellent in the corrosion resistance but also accelerates sintering of the material and increases the strength of the material. However, if the content of CaO is excessive, the melting point of the complex oxide formed is lowered to hinder the use at a high temperature.

That is, it is preferred that the content of $CaB_6$ is not more than 60% by weight. Also, if the content of $CaB_6$ is less than 5% by weight, with the decrease of the produced amount of CaO, the produced amount of BN is also decreased and the effects expected of both of the components are not obtained. Thus, there is an appropriate range in the compounding ratio of the raw materials and a mixed powder containing at least from 5 to 60% by weight of $CaB_6$ and from 5 to 95% by weight of $Al_2O_3$ is preferred.

Fifteenthly, still another useful boron-nitride-containing material of this invention is the material obtained by heating a mixed powder containing at least from 5 to 60% by weight of $B_4C$ and from 5 to 90% by weight of $Al_2O_3$ to a temperature of from 1,600° C. to 2,300° C. in a nitriding atmosphere, and is the boron-nitride-containing material, wherein the material contains at least AlN and BN. Whether or not the material contains AlN and BN can be confirmed through detection of the diffraction peaks corresponding to them using the X-ray diffraction.

As described above, AlN exhibits an excellent corrosion resistance and is particularly excellent in corrosion resistance to molten steel and molten slags. Also, BN has an excellent machining property. To obtain a material having both the characteristics, it is preferred to heat the mixed powder containing at least from 5 to 60% by weight of $B_4C$ and from 5 to 90% by weight of $Al_2O_3$ to a temperature of from 1,600° C. to 2,300° C. in a nitriding atmosphere as described above.

This is because if the heating temperature is lower than 1,600° C., the formation of AlN is difficult and if the heating temperature is higher than 2,300° C., the loss of $Al_2O_3$ of the raw materials by volatilization becomes large. Further, $Al_2O_3$ exhibits an excellent corrosion resistance and hence a part thereof may remain in the unreacted state.

Sixteenthly, other useful boron-nitride-containing material of this invention is the material obtained by heating a mixed powder containing at least from 1 to 20% by weight $CaB_6$, from 5 to 60% by weight of $B_4C$ and from 5 to 90% by weight of $Al_2O_3$ to a temperature of from 1,600° C. to 2,300° C. in a nitriding atmosphere, and is the boron-nitride-containing material, wherein the material contains at least AlN and BN.

Whether or not the material contains AlN and BN can be confirmed through detection of the diffraction peaks corresponding to them using the X-ray diffraction.

AlN exhibits an excellent corrosion resistance and is particularly excellent in corrosion resistance to molten steel and molten slags as described above. Also, BN has an excellent machining property. To obtain material having both the characteristics, it is preferred to heat the mixed powder containing at least from 1 to 20% by weight $CaB_6$, from 5 to 60% by weight of $B_4C$ and from 5 to 90% by weight of $Al_2O_3$ to a temperature of from 1,600° C. to 2,300° C. in a nitriding atmosphere as described above. This is because if the heating temperature is lower than 1,600° C., the formation of AlN is difficult and if the heating temperature is higher than 2,300 ° C., the loss of $Al_2O_3$ of the raw materials by a volatilization becomes large. In addition, $Al_2O_3$ exhibits an excellent corrosion resistance and hence a part thereof may remain in the unreacted state. Also, it is preferred to add from 1 to 20% by weight of $CaB_6$. This is because, by the addition thereof, sintering of the material becomes easy and the strength of the material can be improved. In this case, if the content of $CaB_6$ is less than 1% by weight, the effect of the addition thereof is insufficient and if the content thereof is higher than 20% by weight, a low-melting point complex oxide of CaO and $Al_2O_3$ is formed which lowers the corrosion resistance at high temperatures.

Seventeenthly, another useful boron-nitride-containing material of this invention is the material obtained by heating a mixed powder containing at least from 10 to 80% by weight of $B_4C$ and from 10 to 90% by weight of $SiO_2$ to a temperature of from 1,300° C. to 1,900° C. in a nitriding atmosphere, and is the boron-nitride-containing material, wherein the material contains at least SiC or $Si_3N_4$ and BN, and the ratio of the height of the peak of Si to the height of the peak of B obtained by EDX is in the range of from 0.02 to 15. Whether or not the material contains SiC or $Si_3N_4$ and BN can be confirmed through detection of the diffraction peaks corresponding to them using the X-ray diffraction.

The material is excellent in corrosion resistance to molten steel and molten slags. In particularly, the material is reluctant to be wetted with molten slags and exhibits a very excellent corrosion resistance to the molten slags. The material having such characteristics is obtained by heating a mixed powder containing at least from 10 to 80% by weight of $B_4C$ and from 20 to 90% by weight of $SiO_2$ to a temperature of from 1,300° C. to 1,900° C. in a nitriding atmosphere. In this ease, if the heating temperature is lower than 1,300° C., $SiO_2$ is not reduced with $B_4C$ and if the heating temperature is higher than 1,900° C., the loss of the starting materials by volatilization becomes large, both are undesirable.

In the crystal phases formed, the compound of Si maybe SiC or $Si_3N_4$ but SiC is preferred from the view point of corrosion resistance. When a nitrogen gas is employed as the nitriding atmosphere, by selecting the partial pressure of nitrogen, the Si compound formed can be controlled to be SiC, a mixed phase of SiC and $Si_3N_4$, or $Si_3N_4$. To obtain SiC, a low partial pressure of nitrogen is preferred and a pressure of not higher than 1.1 MPa is suitable.

To obtain the material having both the high corrosion resistance of SiC and/or $Si_3N_4$ and the excellent machining property of boron nitride, it is desirable that the ratio of the height of the peak of Si (as a numerator) to the height of the peak of B (as a denominator) obtained by EDX is in the range of from 0.02 to 15. That is, if the ratio is less than 0.02, the characteristics of SiC and/or $Si_3N_4$ are insufficient and if the ratio is higher than 15, the characteristics of boron nitride become insufficient, both are undesirable.

Eighteenthly, still another useful boron-nitride-containing material of this invention is the material obtained by heating a mixed powder containing at least from 10 to 60% by weight of $B_4C$ and from 40 to 90% by weight of zircon ($ZrO_2 \cdot SiO_2$) to a temperature of from 1,300° C. to 1,900° C. in a nitriding atmosphere, and it is the boron-nitride-containing material, wherein the material contains at least $ZrO_2$, SiC or $Si_3N_4$, and BN, and the ratio of the sum of the heights of the peaks of Si and Zr to the height of the peak of B obtained by EDX is in the range of from 0.02 to 15. Whether or not the material contains $ZrO_2$, SiC or $Si_3N_4$, and BN can be confirmed through detection of the diffraction peaks corresponding to them using the X-ray diffraction.

The material is excellent in corrosion resistance to molten steel and molten slags. In particularly, the material is reluctant to be wetted with molten slags and exhibits a very excellent corrosion resistance to the molten slags. The material having these characteristics is obtained by heating the mixed powder containing at least from 10 to 60% by weight of $B_4C$ and from 40 to 90% by weight of zircon to a temperature of from 1,300° C. to 1,900° C. in a nitriding atmosphere. In this case, if the heating temperature is less than 1,300° C., zircon is not reduced with $B_4C$ and if the heating temperature is higher than 1,900° C., the loss of the starting material by a volatilization becomes large; both are undesirable.

In the crystal phases formed, the compound of Si may be SiC or $Si_3N_4$ but SiC is preferred from the view point of corrosion resistance. When a nitrogen gas is employed as an nitriding atmosphere, by selecting the partial pressure of nitrogen, the Si compound formed can be controlled to be SiC, a mixed phase of SiC and $Si_3N_4$, or $Si_3N_4$. To obtain SiC, a low partial pressure of nitrogen is preferred and a pressure of not higher than 1.1 MPa is suitable.

To obtain the material having both the high corrosion resistance of SiC, $Si_3N_4$, and $ZrO_2$ and the excellent machining property of boron nitride, it is desirable that the ratio of the heights of the peaks of Si and Zr (as a numerator) to the height of the peak of B (as a denominator) obtained by EDX is in the range of from 0.02 to 15. That is, if the ratio is less than 0.02, the characteristics of SiC, $Si_3N_4$, and $ZrO_2$ are insufficient and if the ratio is higher than 15, the characteristics of boron nitride becomes insufficient, which are undesirable.

Nineteenthly, other useful boron-nitride-containing material of this invention is the material obtained by heating a mixed powder containing at least from 10 to 60% by weight $B_4C$ and from 40 to 90% by weight mullite ($3Al_2O_3 \cdot 2SiO_2$) to a temperature of from 1,300° C. to 1,980° C. in a nitriding atmosphere, and is the boron-nitride-containing material, wherein the material contains at least $Al_2O_3$, SiC or $Si_3N_4$, and BN. Whether or not the material contains $Al_2O_3$, SiC or $Si_3N_4$, and BN can be confirmed through detection of the diffraction peaks corresponding to them using the X-ray diffraction.

The material is excellent in the corrosion resistance to molten steel and molten slags. In particularly, the material is reluctant to be wetted with molten slags and exhibits a very excellent corrosion resistance to the molten slags. The material having the characteristics is obtained by heating the mixed powder containing at least from 10 to 60% by weight $B_4C$ and from 40 to 90% by weight mullite to a temperature of from 1,300° C. to 1,900° C. in a nitriding atmosphere. In this case, if the heating temperature is less than 1,300° C., mullite is not reduced with $B_4C$ and if the heating temperature is higher than 1,900° C., the loss of the starting material by a volatilization becomes large; both are undesirable.

In the crystal phases formed, the compound of Si maybe SiC or $Si_3N_4$ but SiC is preferred from the view point of corrosion resistance. When a nitrogen gas is employed as the nitriding atmosphere, by selecting the partial pressure of nitrogen, the Si compound formed can be controlled to be SiC, a mixed phase of SiC and $Si_3N_4$, or $Si_3N_4$. To obtain SiC, a low partial pressure of nitrogen is preferred and a pressure of not higher than 1.1 MPa is suitable.

Twentiethly, another useful boron-nitride-containing material of the present invention is the material obtained by heating a mixed powder containing a boride and oxide in a nitriding atmosphere, and the boron-nitride-containing material, wherein the material contains at least one kind of an oxide having less bonded oxygen, an oxynitride, a nitride, a carbide and a boride obtained by reducing a part or the whole of the oxide with the element bonded to boron in the boride, boron nitride and there is the boron-nitride containing material having residual carbon of at least 10% by selecting $B_4C$ as the boride of the starting materials.

When $B_4C$ is nitrided, 4 moles of BN and one mole of C are formed. It is preferred that a part of C is reacted with the oxide of the starting materials and at least 10% C is left as residual carbon. In general, since C reacts with the air at a temperature of higher than 600° C. and also reacts with many metals, it is considered that C hinders the corrosion resistance of a C-containing material to air or metals. However, when at least 4 moles of BN co-exists in one mole of C, the oxidation of C with air presents substantially no problem up to 1,000° C. and the corrosion resistance to metals becomes almost the same as pure BN.

On the other hand, C exhibits an excellent corrosion resistance to a molten slag. That is, by leaving a part of C of $B_4C$, the corrosion resistance to air, metals, and a molten slag can be made to be the same level as expensive BN. However, when the amount of the residual carbon is less than 10% the total amount of C, the foregoing effect cannot be obtained.

Now, another embodiment of the present invention will be explained. In the embodiment, provided is a method of producing a boron-nitride-containing material, which comprises heating a mixed powder containing at least two kinds of borides in a nitriding atmosphere to shape a compound composed of the elements each bonded to each boride and boron nitride.

There is no particular restriction on the borides to be used as the starting materials but borides of at least one of the elements belonging to Groups II to VI of the periodic table are preferred.

As the borides of the starting materials, those selected from $MgB_2$, $CaB_6$, $AlB_2$, $AlB_{12}$, $TiB_2$, $ZrB_2$, and $B_4C$ are more preferred.

The compound composed of the elements each bonded to each boride includes, for example, $Mg_2Ca$, TiAl, $AlZr_3$, $CaC_2$, and $CaCN_2$.

Examples of the reaction of heating a mixed powder containing at least two kinds of borides in a nitriding atmosphere to shape a compound composed of the elements each bonded to each boride and boron nitride are as follows.

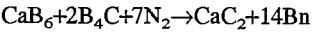

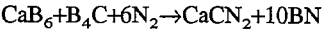

By the reactions, BN which is reluctantly wetted with a molten slag and has a good corrosion resistance to a molten slag can be obtained at a high concentration. For practicing the reaction with a high efficiency, it is preferred to heat a mixed powder containing $CaB_6$ and $B_4C$ such that the weight ratio of $CaB_6/B_4C$ is from 0.20 to 1.20 and the sum of them is at least 18% by weight to a temperature of from 1,200° C. to 2,000° C. in a nitriding atmosphere. The reason is as follows. If the weight ratio of $CaB_6$ to $B_4C$ is outside of the range of from 0.20 to 1.20, either one of them is too large with respect to the stoichiometric ratio of $CaB_6$ to $B_4C$ and the yields of $CaC_2$ or $CaCN_2$ and BN are lowered. Also, if the sum of those two is less than 18% by weight, the proportion of BN in the product is low and thus the characteristics of BN are difficult to obtain. Also, if the nitriding temperature is lower than 1,200° C., the reaction only reluctantly proceeds while if the temperature is higher than 2,000° C., the loss of Ca by volatilization becomes large; both are undesirable. Accordingly, it is preferred to heat the mixed powder of $CaB_6$ and $B_4C$ such that the weight ratio of $CaB_6$ to $B_4C$ is from 0.20 to 1.20 and the sum of them is at least 18% by weight to a temperature of from 1,200° C. to 2,000° C. in a nitriding atmosphere. The boron-nitride-containing material obtained as described above contains at least $CaC_2$ or $CaCN_2$ and BN. Whether or not the material contains these components can be confirmed through X-ray diffraction.

The boron-nitride-containing material containing at least from 3 to 20% by weight $CaC_2$ or $CaCN_2$ and from 19 to 90% by weight BN thus obtained exhibits excellent corrosion resistance to a molten slag.

The boron-nitride-containing material obtained by adding a compound selected from SiC, $Si_3N_4$, $Si_2O_2N$, SiAlON, AlON, and AlN as other component in addition to $CaC_2$ or $CaCN_2$ and BN described above is preferable as a corrosion-resistant material. In particular, the boron-nitride-containing material containing at least from 3 to 20% by weight of $CaC_2$ or $CaCN_2$, from 19 to 90% by weight of BN, and from 20 to 78% by weight of AlN or AlON is the material wherein the corrosion resistance of $CaC_2$ or $CaCN_2$ and BN is more improved by the addition of AlN or AlON having a very excellent corrosion resistance. If the amount of AlN or AlON is less than 20% by weight, the improvement of the corrosion resistance is insufficient and also if the amount thereof is higher than 78% by weight, it becomes difficult to utilize the characteristics of BN. Thus, the amount of AlN or AlON is preferably from 20 to 78% by weight.

It is preferred to add from 10 to 40% by weight a complex oxide of CaO and $ZrO_2$ or cubic $ZrO_2$ to the composition from the viewpoint of the corrosion resistance. However, if the addition amount thereof is less than 10% by weight, the corrosion resistance effect by $ZrO_2$ is less and if the addition amount is more than 40% by weight, the thermal shock resistance is deteriorated; both are undesirable.

The material containing at least $CaC_2$ or $CaCN_2$ and BN can be produced by a known powder sintering method using powdery $CaC_2$ or $CaCN_2$ and BN as the starting materials but it is advantageous to produce the material using $CaB_6$ and $B_4C$ as the starting materials and nitrifying these borides according to the present invention. This is because in the ease of performing the reaction according to the present invention, the mass transfer is accelerated by the reaction, whereby sintering proceeds very easily.

Also, in the case of the material containing AlN and AlON, the material can be produced using powdery AlN and AlON as the starting materials but a method of obtaining AlN by nitriding using an Al powder together with a boride is more preferable. This is because since the nitriding is accompanied by a volume expansion, a sintered product having a high density can be easily obtained. In the ease of aiming at the formation of AlON, $Al_2O_3$ is added simultaneously with the addition of Al, a solid solution thereof with AlN may be formed. In this case, it is preferred that the weight ratio of $Al_2O_3$ (as a numerator) to AlN (as a denominator) is not more than 7.5. If the weight ratio is more than 7.5, a complex oxide of CaO and $Al_2O_3$ having a low melting point is formed spoiling the corrosion resistance.

Then, still a further embodiment of the present invention will be explained. In the embodiment, provided is a method of producing a boron-nitride-containing material, which comprises heating a mixed powder containing at least from 10 to 70% by weight of $B_4C$ and from 30 to 90% by weight of Al to a temperature of from 1,300° C. to 2,000° C. in a nitriding atmosphere, and the material obtained contains BN, AlN, and C. In the embodiment of this invention, C may be crystalline or noncrystalline. That is, the material wherein at least AlN and BN are detected through X-ray diffraction. The material has the feature that the material comprising AlN is excellent in the molten steel resistance and that BN and C each are excellent in the molten slag resistance and is resistant to being corroded by molten steel or a molten slag. The material is produced using a mixed powder containing at least from 10 to 70% by weight of $B_4C$ and from 30 to 90% by weight of Al as the raw materials. This is because if the composition of the raw material is outside the range described above, the content of BN becomes excessive or too small and AlN becomes excessive or too small, whereby the characteristics of the boron-nitride containing material described above are not sufficiently obtained. In nitriding, it is preferred to heat the raw materials to a temperature of from 1,300° C. to 2,000° C. If the heating temperature is lower than 1,300° C., the nitriding of $B_4C$ becomes difficult and also if the heating temperature is higher than 2,000° C., the loss of the raw materials by vaporization becomes large; both of which are undesirable.

As described above, the boron-nitride-containing material containing at least from 22 to 90% by weight of BN, from 8 to 68% by weight of AlN, or AlON and from 2 to 9% by weight of C can be produced. The material composed of AlN and AlON each excellent in the molten steel resistance, and BN and C each excellent in the slag resistance, and has a feature that the material is resistant to being corroded with molten steel and a slag, but if the composition of the raw materials is outside of the range of the composition, it becomes undesirably difficult to obtain both the molten steel resistance and the slag resistance. The boron-nitride-containing material can be also produced by known powder sintering without using the method of this invention described above. There is no restriction on the production method of the boron-nitride-containing material but it is more preferred to product the boron-nitride-containing material by the method of this invention. This is because BN, AlN, AlON, and C are all materials which are resistant to being sintered and thus require an expensive sintering aid such as $Y_2O_3$, etc., for enabling sintering but according to the method of this invention, the transfer of atoms actively occurs in the step of the nitriding and sintering proceeds without the addition of the sintering aid.

In this case, for forming AlON, for example $Al_2O_3$ may he added to the starting materials in addition to Al. AlON is the general term of the solid solution of Al, O, and N and there is no particular restriction on the composition thereof.

Also, by further adding SiC to the starting materials, the slag resistance can be more improved. That is, such an effect is obtained by the boron-nitride-containing material containing at least from 22 to 90% by weight of BN, from 4 to 48% by weight of AlN or AlON, and from 6 to 30% by weight of SiC. SiC exhibits a very excellent slag resistance, has the effect of improving the slag resistance of BN, and by adding from 6 to 30% by weight of SiC, such an effect is effectively obtained. However, if the amount of SiC is less than 6% by weight, such characteristics of SiC can not be obtained and if the amount of higher than 30% by weight, the molten steel resistance is deteriorated.

Then, still other embodiment of the present invention will be explained. According to the embodiment, there is provided the boron-nitride-containing material obtained by heating a mixed powder containing $CaB_6$ and $B_4C$ such that the weight ratio of $CaB_6$ to $B_4C$ is from 0.01 to 0.65 and the sum of them becomes at least 18% by weight to a temperature of from 1,300° C. to 2,000° C. in a nitriding atmosphere, said material containing at least $CaB_6$ and BN.

The inventors have discovered that by nitriding $CaB_6$ and $B_4C$ which coexist, first $B_4C$ is preferentially nitrified to shape BN and C. That is, the substantially total amount of $B_4C$ can be nitrified (to the extent that the detection of $B_4C$ through Xray diffraction becomes difficult) and the whole part or a part of $CaB_6$ can be left in the unreacted state.

Furthermore, the inventors have discovered that unreacted $CaB_6$ functions as a sintering aid of BN and C formed by the nitriding of $B_4C$ described above. When $B_4C$ alone is nitrided, sintering thereof is very difficult but by adding and leaving $CaB_6$, $B_4C$ can be converted to the sintered product. For effectively carrying out sintering, it is preferred that the weight ratio of $CaB_6$ (as a numerator) to $B_4C$ (as a denominator) is in the range of from 0.01 to 0.65. If the weight ratio is less than 0.01, it is difficult to obtain the effect as the sintering aid, and if the ratio is higher than 0.65, $CaB_6$ is nitrided to shape $Ca_3N_2$ and by the vaporization of $Ca_3N_2$, the loss of the raw material becomes large; both of which are undesirable.

It is preferred that the nitriding of $B_4C$ is carried out at the atmospheric temperature of from 1,300° C. to 2,000° C. If the temperature is lower than 1,300° C., the progress of the nitriding is difficult and if the temperature is higher than 2,000° C., the loss of the starting materials through a vaporization becomes large.

There is no particular restriction on the method of carrying out the nitriding of $B_4C$ and restraining the nitriding of $CaB_6$ but, for example, by increasing the packing density of the powders of the starting materials, the void between the particles is narrowed by the volume increase of $B_4C$ by the nitriding, whereby the entering routes of nitrogen are clogged before the nitriding of $CaB_6$ becomes dominative. The inventors have found that by lowering the initial voids such that the amount of voids after the nitriding of $B_4C$ become lower than 14%, the nitriding of $CaB_6$ is retarded. That is, the initial packed density is increased such that the amount of voids becomes lower than 14% by the nitriding of $B_4C$. For example, when the sum of $CaB_6$ and $B_4C$ is 100% by weight, such a condition is satisfied by reducing the voids of the packed materials before the nitriding to 52% or less.

To the boron-nitride-containing material may be added other material(s) in the range that the sum of $CaB_6$ and $B_4C$ becomes at least 18% by weight. The material(s) which are added to the boron-nitride-containing material are required to cause no reaction with $CaB_6$ or to be resistant to react with $CaB_6$. Examples of such materials are nitrides such as TiN, ZrN, AlN, $Si_3N_4$; oxynitrides such as AlON, SiAiON, $Si_2N_2O$, etc.; carbides such as SiC, etc.; and metals such as Al which is converted to AlN by being nitrided, Si which is converted to $Si_3N_4$ by being nitrided or is converted to SiC by being carbonized.

In the boron-nitride-containing materials of this invention described above, the boron-nitride-containing material containing at least from 0.4 to 20% by weight of $CaB_6$, from 19 to 50% by weight of BN, and from 20 to 80% by weight of AlN is excellent in corrosion resistance, in particular, in molten steel resistance and slag resistance. The material has both the characteristics of AlN excellent in the excellent molten steel resistance and the characteristics of BN excellent in the slag resistance and precise sintering of the BN portion having a difficult sintering property becomes possible by means of $CaB_6$, whereby the strength of the sintered product is also improved. To obtain the characteristics of the constituting components, it is preferred that the boron-nitride-containing material contains at least from 0.4 to 20% by weight of $CaB_6$, from 19 to 50% by weight of BN, and from 30 to 80% by weight of AlN.

EXAMPLE

The examples of the present invention will be explained below while comparing them, if necessary, with the comparative examples.

EXAMPLE 1

A mixture of 25.4% by weight of a $CaB_6$ powder having particle sizes of not larger than 44 μm and 74.6% by weight a baddeleyite powder having particle sizes of not larger than 44 μm, wherein the ratio of particle sizes of from 10 to 44 μm was 80% was packed in a graphite vessel having a cavity of a diameter of 60 mm and a height of 50 mm in an amount of 50 g and the packed powders were lightly pressed by applying thereto a surface pressure of 6 MPa via a graphite plate having a diameter of 60 mm and a thickness of 5 mm. The graphite vessel was disposed in a graphite heating furnace, after heating the graphite vessel at a temperature-raising rate of 15° C./minute up to 1,150° C. while evacuating by means of a vacuum pump, a nitrogen gas was introduced to make the nitrogen gas pressure 0.5 MPa (absolute pressure), and after maintaining the system for 48 hours at 1,150° C., the graphite vessel was allowed to cool.

The weight of the sintered product obtained was 55.0 g, the bulk density thereof was 2.57 g/cm², and the relative amount of voids was 35.0%. Also, $3CaO \cdot 17ZrO_2$, $ZrO_2$ (monoclinic system), $ZrB_2$, and BN were identified through the X-ray diffraction. The ratio of the sum of the heights of the peaks of Zr and Ca (as a numerator) to the height of the peak of B (as a denominator) obtained by EDX was 3.9.

From the sintered product, two samples each obtained by splitting the product to ¼ thereof and one sample obtained by splitting the product to ½ thereof were prepared, the former was supplied for a corrosion resistance test and from the latter, a test piece of 3 mm×4 mm×40 mm for a bending test was cut.

On one of the samples for the corrosion test was placed cubic 13Cr steel containing 13.0% by weight of Cr, 0.20% by weight of C, and 0.8% by weight of Si having a side length of 5 mm, on another sample for the corrosion test were placed powders in tablet-formed ($SiO_2$: 35.2% by weight, $Al_2O_3$:4.1% by weight, and CaO: 27.5% by weight) each having a diameter of 5 mm and a height of 5 mm, they were heated at a temperature-raising rate of 15° C./minute up to 1,550° C., and after maintaining them for 2 hours at 1,550° C., they were allowed to cool. Also, after melting and solidifying, the angle of contact with the 13Cr steel and the angle of contact with the slag formed from the tablet-formed powders were measured. The angle of contact with the 13Cr steel was 128° and the angle of contact with the slag was 110°, which confirmed that the BN-containing material exhibited a good corrosion resistance to molten steel and molten slag.

Also, the result of the 3-point bending test of a span length of 30 mm was 16 MPa, which confirmed that the material was at the level making it usable as a refractory for casting.

EXAMPLE 2

A mixture of 25.4% by weight of a $CaB_6$ powder having particle sizes of not larger than 44 μm and 74.6% by weight a baddeleyite powder having particle sizes of not larger than 44 μm, wherein the ratio of particle sizes of from 10 to 44 μm was 80% was packed in a graphite vessel having a cavity of a diameter of 60 mm and a height of 50 mm in an amount of 50 g and the packed powders were lightly pressed by applying a surface pressure of 6 MPa via a graphite plate having a diameter of 60 mm and a thickness of 5 mm. The graphite vessel was disposed in a graphite heating furnace, after heating the graphite vessel at a temperature-raising rate of 15° C./minute up to 1,600° C. while evacuating it using a vacuum pump, a nitrogen gas was introduced to make the nitrogen gas pressure 1.0 MPa (absolute pressure), and after maintaining the system for 8 hours at 1,600° C., the graphite vessel was allowed to cool.

The weight of the sintered product obtained was 55.0 g, the bulk density thereof was 2.57 g/cm$^3$, and the relative amount of voids was 35.0%. Also, through X-ray diffraction, BN, 3CaO·17ZrO$_2$, ZrO and ZrO$_2$ (monoclinic system) were identified. The ratio of the sum of the heights of the peaks of Zr and Ca (as a numerator) to the height of the peak of B (as a denominator) obtained by EDX was 3.7.

From the sintered product, two samples each obtained by splitting the product to ¼ thereof and one sample obtained by splitting the product to ½ thereof were prepared, the former was supplied for a corrosion resistance test and from the latter, a test piece of 3 mm×4 mm×40 mm for a bending test was cut.

On one of the samples for the corrosion test was placed cubic 13 Cr steel having a side length of 5 mm, on another sample for the corrosion test were placed powders in tablet-formed (SiO$_2$:35.2% by weight, Al$_2$O$_3$: 4.1% by weight, and CaO: 27.5% by weight) each having a diameter of 5 mm and a height of 5 mm, they were heated at a temperature-raising rate of 15° C./minute up to 1,550° C., and after maintaining them for 2 hours at 1,550° C., they were allowed to cool. Also, after melting and solidifying it, the angle of contact with the 13Cr steel and the angle of contact with the slag formed from the tablet-formed powders were measured. The angle of contact with the 13Cr steel was 110° and the angle of contact with the slag was 110°, which confirmed that the BN-containing material exhibited a good corrosion resistance to molten steel and molten slag. Also, the result of the 3-point bending test of a span length of 30 mm was 18 MPa, which confirmed that the material was at a level making it usable as a refractory for casting.

EXAMPLE 3

A mixture of 12.8% by weight a B$_4$C powder having particle sizes of not larger than 44 μm and 87.2% by weight of a baddeleyite powder having particle sizes of not larger than 44 μm, wherein the ratio of particle sizes of from 10 to 44 μm was 80% was packed in a graphite vessel having a cavity of a diameter of 60 mm and a height of 50 mm in an amount of 50 g and the packed powders were lightly pressed by applying a surface pressure of 6 MPa thereto via a graphite plate having a diameter of 60 mm and a thickness of 5 mm. The graphite vessel was disposed in a graphite heating furnace, after heating the graphite vessel at a temperature-raising rate of 15° C./minute up to 1,150° C. while evacuating by means of a vacuum pump, a nitrogen gas was introduced to make the nitrogen gas pressure 0.5 MPa (absolute pressure), and after maintaining the system for 8 hours at 1,150° C., the graphite vessel was allowed to cool.

The weight of the sintered product obtained was 50.7 g, the bulk density thereof was 2.41 g/cm$^3$, and the relative amount of voids was 43.8%. Also, through X-ray diffraction, ZrO$_2$ (monoclinic system), ZrB$_2$, and BN were identified. The ratio of the height of the peak of Zr (as a numerator) to the height of the peak of B (as a denominator) obtained by EDX was 6.5.

From the sintered product, two samples each obtained by splitting the product to ¼ thereof and one sample obtained by splitting the product to ½ thereof were prepared, the former was supplied for a corrosion resistance test and from the latter, a test piece of 3 mm×4 mm×40 mm for a bending test was cut.

On one of the samples for the corrosion test was placed cubic 13 Cr steel having a side length of 5 mm, on another sample for the corrosion test were placed tablet-formed powders (SiO$_2$:35.2% by weight, Al$_2$O$_3$: 4.1% by weight, and CaO: 27.5% by weight) each having a diameter of 5 mm and a height of 5 mm, they were heated at a temperature-raising rate of 15° C./minute up to 1,550° C., and after maintaining them for 2 hours at 1,550° C., they were allowed to cool. Also, after melting and solidifying, the angle of contact with the 13Cr steel and the angle of contact with the slag formed from the tablet-formed powders were measured. The angle of contact with the 13Cr steel was 114° and the angle of contact with the slag was 110° which confirmed that the containing material exhibited a good corrosion resistance to molten steel and the molten slag.

Also, the result of the 3-point bending test of a span length of 30 mm was 10 MPa, which confirmed that the material was at a level making it usable as a refractory for casting.

EXAMPLE 4

A mixture of 20.3% by weight of a B$_4$C powder having particle sizes of not larger than 44 μm and 79.7% by weight of a baddeleyite powder having particle sizes of not larger than 44 μm, wherein the ratio of particle sizes of from 10 to 44 μm was 80% was packed in a graphite vessel having a cavity of a diameter of 60 mm and a height of 50 mm in an amount of 50 g and the packed powders were lightly pressed by applying a surface pressure of 6 MPa via a graphite plate having a diameter of 60 mm and a thickness of 5 mm. The graphite vessel was disposed in a graphite heating furnace, after heating the graphite vessel at a temperature-raising rate of 15° C./minute up to 1,600° C. while evacuating by means of a vacuum pump, a nitrogen gas was introduced to make the nitrogen gas pressure 0.5 MPa (absolute pressure), and after maintaining the system for 8 hours at 1,600° C., the graphite vessel was allowed to cool.

The weight of the sintered product obtained was 60.9 g, the bulk density thereof was 2.61 g/cm$^3$, and the relative amount of voids was 32.2%. Also, through X-ray diffraction, ZrO$_2$ (monoclinic system), ZrN, and BN were identified. The ratio of the height of the peak of Zr (as a numerator) to the height of the peak of B (as a denominator) obtained by EDX was 3.7.

From the sintered product, two samples each obtained by splitting the product to ¼ thereof and one sample obtained by splitting the product to ½ thereof were prepared, the former was supplied for a corrosion resistance test and from the latter, a test piece of 3 mm×4 mm×40 mm for a bending test was cut.

On one of the samples for the corrosion test was placed cubic 13Cr steel having a side length of 5 mm, on another sample for the corrosion test were placed tablet-formed powders (SiO$_2$:35.2% by weight, Al$_2$O$_3$: 4.1% by weight, and CaO: 27.5% by weight) each having a diameter of 5 mm and a height of 5 mm, they were heated at a temperature-raising rate of 15° C./minute up to 1,550° C., and after maintaining them for 2 hours at 1,550° C., they were allowed to cool. Also, after melting and solidifying, the angle of contact with the 13Cr steel and the angle of contact with the slag formed from the tablet-formed powders were measured. The angle of contact with the 13Cr steel was 108° and the angle of contact with the slag was 110°, which confirmed that the BN-containing material exhibited a good corrosion resistance to molten steel and molten slag.

Also, the result of the 3-point bending test of a span length of 30 mm was 32 MPa, which confirmed that the material was at a level making it usable as a refractory for casting.

EXAMPLE 5

A mixture of 1.5% by weight of a $CaB_6$ powder having particle sizes of not larger than 44 μm, 11.3% by weight a $B_4C$ powder having particle sizes of not larger than 44 μm and 87.2% by weight of a baddeleyite powder having particle sizes of not larger than 44 μm, wherein the ratio of particle sizes of from 10 to 44 μm was 80% was packed in a graphite vessel having a cavity of a diameter of 60 mm and a height of 50 mm in an amount of 50 g and the packed powders were lightly pressed by applying a surface pressure of 6 MPa thereto via a graphite plate having a diameter of 60 mm and a thickness of 5 mm. The graphite vessel was disposed in a graphite heating furnace, after heating the graphite vessel at a temperature-raising rate of 15° C./minute up to 1,600° C. while evacuating by means of a vacuum pump, a nitrogen gas was introduced to make the nitrogen gas pressure of 0.5 MPa (absolute pressure), and after maintaining the system for 8 hours at 1,600° C., the graphite vessel was allowed to cool.

The weight of the sintered product obtained was 54.6 g, the bulk density thereof was 2.60 g/cm$^3$, and the relative amount of voids was 40.1%. Also, by means of X-ray diffraction, $ZrO_2$ 2 (monoclinic system), $ZrO_2$ (cubic system), and BN were identified. The ratio of the sum of the heights of the peaks of Zr and Ca (as a numerator) to the height of the peak of B (as a denominator) obtained by EDX was 6.6.

From the sintered product, two samples each obtained by splitting the product to ¼ thereof and one sample obtained by splitting the product to ½ thereof were prepared, the former was supplied for a corrosion resistance test and from the latter, a test piece of 3 mm×4 mm×40 mm for a bending test was cut.

On one of the samples for the corrosion test was placed cubic 13 Cr steel having a side length of 5 mm, on another sample for the corrosion test were placed tablet-formed powders ($SiO_2$:35.2% by weight, $Al_2O_3$: 4.1% by weight, and CaO: 27.5% by weight) each having a diameter of 5 mm and a height of 5 mm, they were heated at a temperature-raising rate of 15° C./minute up to 1,550° C., and after maintaining them for 2 hours at 1,550° C., they were allowed to cool. Also, after melting and solidifying, the angle of contact with the 13Cr steel and the angle of contact with the slag formed from the tablet-formed powders were measured. The angle of contact with the 13Cr steel was 100° and the angle of contact with the slag was 105°, which confirmed that the BN-containing material exhibited a good corrosion resistance to molten steel and molten slag.

Also, the result of the 3-point bending test of a span length of 30 mm was 32 MPa, which confirmed that the material was at a level making it usable as a refractory for casting.

EXAMPLE 6

A mixture of 9.0% by weight of a $CaB_6$ powder having particle sizes of not larger than 44 μm, 20.3% by weight a $B_4C$ powder having particle sizes of not larger than 44 μm, 42.8% by weight of an $Al_2O_3$ powder having particle sizes of not larger than 10 μm, and 27.9% by weight of a baddeleyite powder having particle sizes of not larger than 44 μm, wherein the ratio of particle sizes of from 10 to 44 μm was 80% was packed in a graphite vessel having a cavity of a diameter of 60 mm and a height of 50 mm in an amount of 50 g and the packed powders were lightly pressed by applying a surface pressure of 6 MPa thereto via a graphite plate having a diameter of 60 mm and a thickness of 5 mm.

The graphite vessel was disposed in a graphite heating furnace, after heating the graphite vessel at a temperature-raising rate of 15° C./minute up to 1,600° C. while evacuating by means of a vacuum pump, a nitrogen gas was introduced to make the nitrogen gas pressure 0.5 MPa (absolute pressure), and after maintaining the system for 3 hours at 1,600° C., the graphite vessel was allowed to cool.

The weight of the sintered product obtained was 58.3 g, the bulk density thereof was 2.59 g/cm$^3$, and the relative amount of voids was 27.8%. Also, through X-ray diffraction, $ZrO_2$ (monoclinic system), $CaO \cdot 2Al_2O_3$, $ZrB_2$, and BN were identified.

From the sintered product, two samples each obtained by splitting the product to ¼ thereof and one sample obtained by splitting the product to ½ thereof were prepared, the former was supplied for a corrosion resistance test and from the latter, a test piece of 3 mm×4 mm×40 mm for a bending test was cut.

On one of the samples for the corrosion test was placed cubic 13 Cr steel having a side length of 5 mm, on another sample for the corrosion test were placed tablet-formed powders ($SiO_2$:35.2% by weight, $Al_2O_3$: 4.1% by weight, and CaO: 27.5% by weight) each having a diameter of 5 mm and a height of 5 mm, they were heated at a temperature-raising rate of 15° C./minute up to 1,550° C., and after maintaining them for 2 hours at 1,550° C., they were allowed to cool. Also, after melting and solidifying, the angle of contact with the 13Cr steel and the angle of contact with the slag formed from the tablet-formed powders were measured. The angle of contact of the 13Cr steel was 110° and the angle of contact of the slag was 100°, which confirmed that the BN containing material exhibited a good corrosion resistance to molten steel and molten slag.

Also, the result of the 3-point bending test of a span length of 30 mm was 26 MPa, which confirmed that the material was at a level making it usable as a refractory for casting.

EXAMPLE 7

A mixture of 43.4% by weight of a $CaB_6$ powder having particle sizes of not larger than 44 μm and 56.6% by weight of an $Al_2O_3$ powder having particle sizes of not larger than 10 μm was packed in a graphite vessel having a cavity of a diameter of 60 mm and a height of 50 mm in an amount of 50 g and the packed powders were lightly pressed by applying a surface pressure of 6 MPa thereto via a graphite plate having a diameter of 60 mm and a thickness of 5 mm. The graphite vessel was disposed in a graphite heating furnace, after heating the graphite vessel at a temperature-raising rate of 15° C./minute up to 1,600° C. while evacuating by means of a vacuum pump, a nitrogen gas was introduced to make the nitrogen gas pressure 0.5 MPa (absolute pressure), and after maintaining the system for 3 hours at 1,600° C., the graphite vessel was allowed to cool.

The weight of the sintered product obtained was 81.0 g, the bulk density thereof was 2.04 g/cm³, and the relative amount of voids was 20.1%. Also, by means of the X-ray diffraction, CaO·2Al$_2$O$_3$ and BN were identified.

From the sintered product, two samples each obtained by splitting the product to ¼ thereof and one sample obtained by splitting the product to ½ thereof were prepared, the former was supplied to a corrosion resistance test and from the latter, a test piece of 3 mm×4 mm×40 mm for a bending test was cut.

On one of the samples for the corrosion test was placed cubic 13 Cr steel having a side length of 5 mm, on another sample for the corrosion test were placed tablet-formed powders (SiO$_2$:35.2% by weight, Al$_2$O$_3$: 4.1% by weight, and CaO: 27.5% by weight) each having a diameter of 5 mm and a height of 5 mm, they were heated at a temperature-raising rate of 15° C./minute up to 1,550° C., and after maintaining them for 2 hours at 1,550° C., they were allowed to cool. Also, after melting and solidifying, the angle of contact with 13Cr steel and the angle of contact with the slag formed from the tablet-formed powders were measured. The angle of contact with the 13Cr steel was 110° and the angle of contact with the slag was 90°, which confirmed that the BN-containing material exhibited a good corrosion resistance to molten steel and molten slag. Also, the result of the 3 point bending test of a span length of 30 mm was 21 MPa, which confirmed that the material was at a level making it usable as a refractory for casting.

EXAMPLE 8

A mixture of 16.1% by weight of a CaB$_6$ powder having particle sizes of not larger than 44 μm, 50.9% by weight of a B$_4$C powder having particle sizes of not larger than 44 μm, and 33.0% by weight of Al$_2$O$_4$ having particle sizes of not larger than 10 μm was packed in a graphite vessel having a cavity of a diameter of 60 mm and a height of 50 mm in an amount of 50 g and the packed powders were lightly pressed by applying a surface pressure of 6 MPa thereto via a graphite plate having a diameter of 60 mm and a thickness of 5 mm. The graphite vessel was disposed in a graphite heating furnace, after heating the graphite vessel at a temperature-raising rate of 15° C./minute up to 1,600° C. while evacuating by means of a vacuum pump, a nitrogen gas was introduced to make the nitrogen gas pressure 1.0 MPa (absolute pressure), then, the temperature was further raised to 1,900° C., and after maintaining the system for 8 hours at 1,900° C., the graphite vessel was allowed to cool.

The weight of the sintered product obtained was 83.0 g, the bulk density thereof was 1.75 g/cm³, and the relative amount of voids was 31.0%. Also, through X-ray diffraction, BN, AlN, and CaO·2Al$_2$O$_3$ were identified.

From the sintered product, two samples each obtained by splitting the product to ¼ thereof and one sample obtained by splitting the product to ½ thereof were prepared, the former was supplied to a corrosion resistance test and from the latter, a test piece of 3 mm×4 mm×40 mm for a bending test was cut.

On one of the samples for the corrosion test was placed cubic 13 Cr steel having a side length of 5 mm, on another sample for the corrosion test were placed tablet-formed powders (SiO$_2$:35.2% by weight, Al$_2$O$_3$: 4.1% by weight, and CaO: 27.5% by weight) each having a diameter of 5 mm and a height of 5 mm, they were heated at a temperature-raising rate of 15° C./minute up to 1,550° C., and after maintaining them for 2 hours at 1,550° C., they were allowed to cool. Also, after melting and solidifying, the angle of contact with the 13Cr steel and the angle of contact with the slag formed from the tablet-formed powders were measured. The angle of contact with the 13Cr steel was 110° and the angle of contact with the slag was 92°, which confirmed that the BN-containing material exhibited a good corrosion resistance to molten steel and molten slag. Also, the result of the 3 point bending test of a span length of 30 mm was 14 MPa, which confirmed that the material was made usable as a refractory for casting.

EXAMPLE 9

A mixture of 73.4% by weight of a B$_4$C powder having particle sizes of not larger than 44 μm and 26.6% by weight of SiO$_2$ having particle sizes of not larger than 10 μm was packed in a graphite vessel having a cavity of a diameter of 60 mm and a height of 50 mm in an amount of 50 g and the packed powders were lightly pressed by applying a surface pressure of 6 MPa thereto via a graphite plate having a diameter of 60 mm and a thickness of 5 mm. The graphite vessel was disposed in a graphite heating furnace, after heating the graphite vessel at a temperature-raising rate of 15° C./minute up to 1,600° C. while evacuating by means of a vacuum pump, a nitrogen gas was introduced to make the nitrogen gas pressure 1.0 MPa (absolute pressure), and after maintaining the system for 8 hours at 1,600° C., the graphite vessel was allowed to cool.

The weight of the sintered product obtained was 66.4 g, the bulk density thereof was 1.76 g/cm³, and the relative amount of voids was 2.7%. Also, through X-ray diffraction, BN and SiC were identified. The ratio of the height of the peak of Si (as a numerator) to the height of the peak of B (as a denominator) obtained by EDX was 0.4.

From the sintered product, two samples each obtained by splitting the product to ¼ thereof and one sample obtained by splitting the product to ½ thereof were prepared, the former was supplied to a corrosion resistance test and from the latter, a test piece of 3 mm×4 mm×40 mm for a bending test was cut.

On one of the samples for the corrosion test was placed cubic 13 Cr steel having a side length of 5 mm, on another sample for the corrosion test were placed tablet-formed powders (SiO$_2$:35.2% by weight, Al$_2$O$_3$: 4.1% by weight, and CaO: 27.5% by weight) each having a diameter of 5 mm and a height of 5 mm, they were heated at a temperature-raising rate of 15° C./minute up to 1,550° C., and after maintaining them for 2 hours at 1,550° C., they were allowed to cool. Also, after melting and solidifying, the angle of contact with the 13Cr steel and the angle of contact with the slag formed from the tablet-formed powders were measured. The angle of contact with the 13Cr steel was 90° and the angle of contact with the slag was 120°, which confirmed that the BN-containing material exhibited a good corrosion resistance to molten steel and molten slag. Also, the result of the 3-point bending test of a span length of 30 mm was 9 MPa, which confirmed that the material was make usable as a refractory for casting.

EXAMPLE 10

A mixture of 47.5% by weight of a B$_4$C powder having particle sizes of not larger than 44 μm and 52.5% by weight of a zircon (ZrO$_2$·SiO$_2$) powder having particle sizes of not larger than 44 μm was packed in a graphite vessel having a cavity of a diameter of 60 mm and a height of 50 mm in an amount of 50 g and the packed powders were lightly pressed by applying a surface pressure of 6 MPa thereto via a graphite plate having a diameter of 60 mm and a thickness of 5 mm. The graphite vessel was disposed in a graphite heating furnace, after heating the graphite vessel at a temperature-raising rate of 15° C./minute up to 1,600° C. while evacuating by means of a vacuum pump, a nitrogen gas was introduced to make the nitrogen gas pressure 1.0 MPa (absolute pressure), and after maintaining the system for 8 hours at 1,600° C., the graphite vessel was allowed to cool.

The weight of the sintered product obtained was 66.1 g, the bulk density thereof was 2.24 g/cm$^3$, and the relative amount of voids was 18.0%. Also, through X-ray diffraction, BN, $ZrO_2$ (monoclinic system), SiC, and ZrN were identified. The ratio of the sum of the heights of the peaks of Si and Zr (as a numerator) to the height of the peak of B (as a denominator) obtained by EDX was 1.2.

From the sintered product, two samples each obtained by splitting the product to ¼ thereof and one sample obtained by splitting the product to ½ thereof were prepared, the former was supplied to a corrosion resistance test and from the latter, a test piece of 3 mm×4 mm×40 mm for a bending test was cut.

On one of the samples for the corrosion test was placed cubic 13 Cr steel having a side length of 5 mm, on another sample for the corrosion test were placed tablet-formed powders ($SiO_2$:35.2% by weight, $Al_2O_3$: 4.1% by weight, and CaO: 27.5% by weight) each having a diameter of 5 mm and a height of 5 mm, they were heated at a temperature-raising rate of 15° C./minute up to 1,550° C., and after maintaining them for 2 hours at 1,550° C., they were allowed to cool. Also, after melting and solidifying, the angle of contact with the 13Cr steel and the angle of contact with the slag formed from the tablet-formed powders were measured. The angle of contact with the 13Cr steel was 108° and the angle of contact with the slag was 110°, which confirmed that the BN-containing material exhibited a good corrosion resistance to molten steel and molten slag. Also, the result of the 3-point bending test of a span length of 30 mm was 11 MPa, which confirmed that the material was made usable as a refractory for casting.

EXAMPLE 11

A mixture of 43.9% by weight of a $B_4C$ powder having particle sizes of not larger than 44 μm and 56.1% by weight of a mullite ($3Al_2O_3·2SiO_2$) having an average particle size of 3.5 μm was packed in a graphite vessel having a cavity of a diameter of 60 mm and a height of 50 mm in an amount of 50 g and the packed powders were lightly pressed by applying a surface pressure of 6 MPa thereto via a graphite plate having a diameter of 60 mm and a thickness of 5 mm. The graphite vessel was disposed in a graphite heating furnace, after heating the graphite vessel at a temperature-raising rate of 15 ° C./minute up to 1,600° C. while evacuating by means of a vacuum pump, a nitrogen gas was introduced to make the nitrogen gas pressure 1.0 MPa (absolute pressure), and after maintaining the system for 8 hours at 1,600° C., the graphite vessel was allowed to cool.

The weight of the sintered product obtained was 64.6 g, the bulk density thereof was 2.15 g/cm$^3$, and the relative amount of voids was 19.2%. Also, through X-ray diffraction, $Al_2O_3$, BN, and SiC were identified.

From the sintered product, two samples each obtained by splitting the product to ¼ thereof and one sample obtained by splitting the product to ½ thereof were prepared, the former was supplied to a corrosion resistance test and from the latter, a test piece of 3 mm×4 mm×40 mm for a bending test was cut.

On one of the samples for the corrosion test was placed cubic 13 Cr steel having a side length of 5 mm, on another sample for the corrosion test were placed tablet-formed powders ($SiO_2$:35.2% by weight, $Al_2O_3$: 4.1% by weight, and CaO: 27.5% by weight) each having a diameter of 5 mm and a height of 5 mm, they were heated at a temperature-raising rate of 15° C./minute up to 1,550° C., and after maintaining them for 2 hours at 1,550° C., they were allowed to cool. Also, after melting and solidifying, the angle of contact with the 13Cr steel and the angle of contact with the slag formed from the tablet-formed powders were measured. The angle of contact with the 13Cr steel was 100° and the angle of contact with the slag was 105°, which confirmed that the BN-containing material exhibited a good corrosion resistance to molten steel and molten slag. Also, the result of the 3-point bending test of a span length of 30 mm was 18 MPa, which confirmed that the material was made usable as a refractory for casting.

EXAMPLE 12

A mixture of 48.7% by weight of a $CaB_6$ powder having particle sizes of not larger than 44 μm and 51.3% by weight of a $B_4C$ powder having particle sizes of not larger than 44 μm was packed in a graphite vessel having a cavity of a diameter of 60 mm and a height of 50 mm in an amount of 50 g and the packed powders were lightly pressed by applying a surface pressure of 2 MPa thereto via a graphite plate having a diameter of 60 mm and a thickness of 5 mm. The bulk density of the packed powders was 0.94 g/cm$^3$. The graphite vessel was disposed in a graphite heating furnace, after heating the graphite vessel at a temperature-raising rate of 15° C./minute up to 1,600° C. while evacuating by means of a vacuum pump, a nitrogen gas was introduced to make the nitrogen gas pressure 1.0 MPa (absolute pressure), and after maintaining the system for 8 hours at 1,600° C., the graphite vessel was allowed to cool.

The weight of the sintered product obtained was 91.1 g, the bulk density thereof was 1.71 g/cm$^3$, and the relative amount of voids was 24.4%. Also, through X-ray diffraction, BN and $CaCN_2$ were identified. The composition presumed by the calculation was 84.4% by weight of BN and 15.6% by weight of $CaCN_2$.

From the sintered product, two samples each obtained by splitting the product to ¼ thereof and one sample obtained by splitting the product to ½ thereof were prepared, the former was supplied to a corrosion resistance test and from the latter, a test piece of 3 mm×4 mm×40 mm for a bending test was cut.

On one of the samples for the corrosion test was placed cubic 13 Cr steel having a side length of 5 mm, on another sample for the corrosion test were placed tablet-formed powders ($SiO_2$: 35.2% by weight, $Al_2O_3$: 4.1% by weight, and CaO: 27.5% by weight) each having a diameter of 5 mm and a height of 5 mm, they were heated at a temperature-raising rate of 15° C./minute up to 1,550° C., and after maintaining them for 2 hours at 1,550 ° C., they were allowed to cool. Also, after melting and solidifying, the angle of contact with the 13Cr steel and the angle of contact with the slag formed from the tablet-formed powders were measured. The sample reacted with 13Cr steel to shape depressions.

However, the angle of contact with the slag was 104°, which confirmed that the BN-containing material exhibited a good corrosion resistance to molten slag. Also, the result of the 3 point bending test of a span length of 30 mm was 6 MPa, which confirmed that the material was made usable i as a refractory for casting.

EXAMPLE 13

A mixture of 48.7% by weight of a $CaB_6$ powder having particle sizes of not larger than 44 μm and 51.3% by weight of a $B_4C$ powder having particle sizes of not larger than 44 μm was packed in a graphite vessel having a cavity of a diameter of 60 mm and a height of 50 mm in an amount of 50 g and the packed powders were lightly pressed by applying a surface pressure of 10 MPa via a graphite plate having a diameter of 60 mm and a thickness of 5 mm. The bulk density of the packed powders was 1.36 g/cm³. The graphite vessel was disposed in a graphite heating furnace, after heating the graphite vessel at a temperature-raising rate of 15° C./minute up to 1,600° C. while evacuating by means of a vacuum pump, a nitrogen gas was introduced to make the nitrogen gas pressure 1.0 MPa (absolute pressure), and after maintaining the system for 8 hours at 1,600° C., the graphite vessel was allowed to cool.

The weight of the sintered product obtained was 80.2 g, the bulk density thereof was 2.18 g/cm³, and the relative amount of voids was 3.5%. Also, through X-ray diffraction, BN and $CaB_6$ were identified. The composition presumed by the calculation was 60.6% by weight BN, 32.1% by weight of $CaB_6$, and 7.3% by weight of C.

From the sintered product, two samples each obtained by splitting the product to ¼ thereof and one sample obtained by splitting the product to ½ thereof were prepared, the former was supplied to a corrosion resistance test and from the latter, a test piece of 3 mm×4 mm×40 mm for a bending test was cut.

On one of the samples for the corrosion test was placed cubic 13 Cr steel having a side length of 5 mm, on another sample for the corrosion test were placed tablet-formed powders ($SiO_2$:35.2% by weight, $Al_2O_3$:4.1% by weight, and CaO: 27.5% by weight) each having a diameter of 5 mm and a height of 5 mm, they were heated at a temperature-raising rate of 15° C./minute up to 1,550° C., and after maintaining them for 2 hours at 1,550° C., they were allowed to cool. Also, after melting and solidifying, the angle of contact with the 13Cr steel and the angle of contact with the slag formed from the tablet-formed powders were measured. The sample reacted with 13Cr steel to shape depressions. However, the angle of contact with the slag was 105°, which confirmed that the BN-containing material exhibited a good corrosion resistance to molten slag. Also, the result of the 3 point bending test of a span length of 30 mm was 8 MPa, which confirmed that the material was made usable as a refractory for casting.

EXAMPLE 14

A mixture of 27.8% by weight of a $CaB_6$ powder having particle sizes of not larger than 44 μm, 29.3% by weight of a $B_4C$ powder having particle sizes of not larger than 44 μm, and 42.9% by weight of Al having particle sizes of not larger than 74 μm was packed in a graphite vessel having a cavity of a diameter of 60 mm and a height of 50 mm in an amount of 50 g and the packed powders were lightly pressed by applying a surface pressure of 2 MPa thereto via a graphite plate having a diameter of 60 mm and a thickness of 5 mm. The graphite vessel was disposed in a graphite heating furnace, after heating the graphite vessel at a temperature-raising rate of 15° C./minute up to 1,600° C. while evacuating by means of a vacuum pump, a nitrogen gas was introduced to make the nitrogen gas pressure 1.0 MPa (absolute pressure), and after maintaining the system for 8 hours at 1,600° C., the graphite vessel was allowed to cool.

The weight of the sintered product obtained was 87.1 g, the bulk density thereof was 2.24 g/cm³, and the relative amount of voids was 12.0%. Also, through X-ray diffraction, BN, AlN and $CaCN_2$ were identified. The composition presumed by the calculation was 52.8% by weight of BN, 37.4% by weight of AlN, and 9.8% by weight of $CaCN_2$. From the sintered product, two samples each obtained by splitting the product to ¼ thereof and one sample obtained by splitting the product to ½ thereof were prepared, the former was supplied to a corrosion resistance test and from the latter, a test piece of 3 mm×4 mm×40 mm for a bending test was cut.

On one of the samples for the corrosion test was placed cubic 13 Cr steel having a side length of 5 mm, on another sample for the corrosion test were placed tablet-formed powders ($SiO_2$:35.2% by weight, $Al_2O_3$: 4.1% by weight, and CaO: 27.5% by weight) each having a diameter of 5 mm and a height of 5 mm, they were heated at a temperature-raising rate of 15° C./minute up to 1,550° C., and after maintaining them for 2 hours at 1,550° C., they were allowed to cool. Also, after melting and solidifying, the angle of contact with the 13Cr steel and the angle of contact with the slag formed from the tablet-formed powders were measured. The angle of contact with the 13Cr steel was 110° and the angle of contact with the slag was 88°, which confirmed that the BN-containing material exhibited a good corrosion resistance to molten steel. Also, the result of the 3-point bending test of a span length of 30 mm was 32 MPa, which confirmed that the material was at a level at which is usable as a refractory for casting.

EXAMPLE 15

A mixture of 13.5% by weight of a $CaB_6$ powder having particle sizes of not larger than 44 mm, 43.7% by weight of a $B_4C$ powder having particle sizes of not larger than 44 μm, and 42.8% by weight of an Al powder having particle sizes of not larger than 74 μm was packed in a graphite vessel having a cavity of a diameter of 60 mm and a height of 50 mm in an amount of 50 g and the packed powders were lightly pressed by applying a surface pressure of 10 MPa thereto via a graphite plate having a diameter of 60 mm and a thickness of 5 mm. The graphite vessel was disposed in a graphite heating furnace, after heating the graphite vessel at a temperature-raising rate of 15° C./minute up to 1,600° C. while evacuating by means of a vacuum pump, a nitrogen gas was introduced to make the nitrogen gas pressure 1.0 MPa (absolute pressure), and after maintaining the system for 8 hours at 1,600° C., the graphite vessel was allowed to cool.

The weight of the sintered product obtained was 83.4 g, the bulk density thereof was 2.14 g/cm³, and the relative amount of voids was 5.0%. Also, through X-ray diffraction, BN, AlN and $CaB_6$ were identified. The composition presumed by the calculation was 47.2% by weight of BN, 39.0% by weight of AlN, 8.1% by weight of $CaB_6$, and 5.7% by weight of C.

From the sintered product, two samples each obtained by splitting the product to ¼ thereof and one sample obtained by splitting the product to ½ thereof were prepared, the former was supplied to a corrosion resistance test and from the latter, a test piece of 3 mm×4 mm×40 mm for a bending test was cut.

On one of the samples for the corrosion test was placed cubic 13 Cr steel having a side length of 5 mm, on another sample for the corrosion test were placed tablet-formed powders ($SiO_2$:35.2% by weight, $Al_2O_3$: 4.1% by weight, and CaO: 27.5% by weight) each having a diameter of 5 mm and a height of 5 mm, they were heated at a temperature-raising rate of 15° C./minute up to 1,550° C., and after maintaining them for 2 hours at 1,550° C., they were allowed to cool. Also, after melting and solidifying, the angle of contact with the 13Cr steel and the angle of contact with the slag formed from the tablet-formed powders were measured. The angle of contact with the 13 Cr steel was 110° and the angle of contact with the slag was 86°, which confirmed that the BN-containing material exhibited a good corrosion resistance to molten steel. Also, the result of the 3 point bending test of a span length of 30 mm was 34 MPa, which confirmed that the material was made usable as a refractory for casting.

EXAMPLE 16

A mixture of 18.2% by weight of a $CaB_6$ powder having particle sizes of not larger than 44 μm, 19.1% by weight of a $B_4C$ powder having particle sizes of not larger than 44 μm, 34.7% by weight of a baddeleyite powder having particle sizes of not larger than 44 μm, and 28.2% by weight of Al having particle sizes of not larger than 74 μm was packed in a graphite vessel having a cavity of a diameter of 60 mm and a height of 50 mm in an amount of 50 g and the packed powders were lightly pressed by applying a surface pressure of 10 MPa thereto via a graphite plate having a diameter of 60 mm and a thickness of 5 mm. The graphite vessel was disposed in a graphite heating furnace, after heating the graphite vessel at a temperature-raising rate of 15° C. minute up to 1,600° C. while evacuating by means of a vacuum pump, a nitrogen gas was introduced to make the nitrogen gas pressure 1.0 MPa (absolute pressure), and after maintaining the system for 8 hours at 1,600° C., the graphite vessel was allowed to cool.

The weight of the sintered product obtained was 74.0 g, the bulk density thereof was 2.59 g/cm$^3$, and the relative amount of voids was 11.8%. Also, through X-ray diffraction, BN, AlN, $3CaO \cdot 17ZrO_2$, and $CaCN_2$ were identified. The composition presumed by the calculation was 40.5% by weight of BN, 28.7% by weight of AlN, 23.3% by weight of $3CaO \cdot 17ZrO_2$, and 7.5% by weight $CaCN_2$.

From the sintered product, two samples each obtained by splitting the product to ¼ thereof and one sample obtained by splitting the product to ½ thereof were prepared, the former was supplied to a corrosion resistance test and from the latter, a test piece of 3 mm×4 mm×40 mm for a bending test was cut.

On one of the samples for the corrosion test was placed cubic 13Cr steel having a side length of 5 mm, on another sample for the corrosion test were placed tablet-formed powders ($SiO_2$:35.2% by weight, $Al_2O_3$: 4.1% by weight, and CaO: 27.5% by weight) each having a diameter of 5 mm and a height of 5 mm, they were heated at a temperature-raising rate of 15° C./minute up to 1,550° C., and after maintaining them for 2 hours at 1,550° C., they were allowed to cool. Also, after melting and solidifying, the angle of contact with the 13Cr steel and the angle of contact with the slag formed from the tablet-formed powders were measured. The angle of contact with the 13Cr steel was 100° and the angle of contact with the slag was 96°, which confirmed that the BN-containing material exhibited a good corrosion resistance to molten steel and molten slag. Also, the result of the 3 point bending test of a span length of 30 mm was 25 MPa, which confirmed that the material was made usable as a refractory for casting.

EXAMPLE 17

A mixture of 50.5% by weight of a $B_4C$ powder having particle sizes of not larger than 44 μm and 49.5% by weight of an Al powder having particle sizes of not larger than 74 μm was packed in a graphite vessel having a cavity of a diameter of 60 mm and a height of 50 mm in an amount of 50 g and the packed powders were lightly pressed by applying a surface pressure of 10 MPa via a graphite plate having a diameter of 60 mm and a thickness of 5 mm. The graphite vessel was disposed in a graphite heating furnace, after heating the graphite vessel at a temperature-raising rate of 15° C./minute up to 1,600° C. while evacuating by means of a vacuum pump, a nitrogen gas was introduced to make the nitrogen gas pressure 1.0 MPa (absolute pressure), and after maintaining the system for 8 hours at 1,600° C., the graphite vessel was allowed to cool.

The weight of the sintered product obtained was 65.7 g, the bulk density thereof was 1.93 g/cm$^3$, and the relative amount of voids was 7.1%. Also, through X-ray diffraction, BN, AlN, and C were identified. The composition presumed by the calculation was 51.4% by weight of BN, 42.4% by weight of AlN, and 6.2% by weight of C.

From the sintered product, two samples each obtained by splitting the product to ¼ thereof and one sample obtained by splitting the product to ½ thereof were prepared, the former was supplied to a corrosion resistance test and from the latter, a test piece of 3 mm×4 mm×40 mm for a bending test was cut.

On one of the samples for the corrosion test was placed cubic 13 Cr steel having a side length of 5 mm, on another sample for the corrosion test were placed tablet-formed powders ($SiO_2$:35.2% by weight, $Al_2O_3$: 4.1% by weight, and CaO: 27.5% by weight) each having a diameter of 5 mm and a height of 5 mm, they were heated at a temperature-raising rate of 15° C./minute up to 1,550° C., and after maintaining them for 2 hours at 1,550° C., they were allowed to cool. Also, after melting and solidifying, the angle of contact with the 13Cr steel and the angle of contact with the slag formed from the tablet-formed powders were measured. The angle of contact with the 13Cr steel was 110° and the angle of contact with the slag was 90°, which confirmed that the BN-containing containing material exhibited a good corrosion resistance to molten steel and molten slag. Also, the result of the 3 point bending test of a span length of 30 mm was 110 MPa, which confirmed that the material was made usable as a refractory for casting.

EXAMPLE 18

A mixture of 43.9% by weight of a $B_4C$ powder having particle sizes of not larger than 44 μm, 40.2% by weight of a baddeleyite powder having particles sizes of not larger than 44 μm, and 15.9% by weight of a $SiO_2$ powder having particle sizes of not larger than 10 μm was packed in a graphite vessel having a cavity of a diameter of 60 mm and a height of 50 mm in an amount of 50 g and the packed powders were lightly pressed by applying a surface pressure of 10 MPa thereto via a graphite plate having a diameter of 60 mm and a thickness of 5 mm. The graphite vessel was disposed in a graphite heating furnace, after heating the graphite vessel at a temperature-raising rate of 15° C./minute up to 1,600° C. while evacuating by means of a vacuum pump, a nitrogen gas was introduced to make the nitrogen gas pressure 1.0 MPa (absolute pressure), and after maintaining the system for 8 hours at 1,600° C., the graphite vessel was allowed to cool.

The weight of the sintered product obtained was 64.2 g, the bulk density thereof was 1.78 g/cm$^3$, and the relative amount of voids was 18.9%. Also, through X-ray diffraction, BN, $ZrO_2$ (monoclinic system), SiC, and ZrN were identified. The composition presumed by the calculation was 60.8% by weight of BN, 28.0% by weight of $ZrO_2$ (monoclinic system), 8.2% by weight of SiC, and 3.0% by weight of ZrN.

From the sintered product, two samples each obtained by splitting the product to ¼ thereof and one sample obtained by splitting the product to ½ thereof were prepared, the former was supplied to a corrosion resistance test and from the latter, a test piece of 3 mm×4 mm×40 mm for a bending test was cut.

On one of the samples for the corrosion test was placed cubic 13 Cr steel having a side length of 5 mm, on another sample for the corrosion test were placed tablet-formed powders ($SiO_2$:35.2% by weight, $Al_2O_3$: 4.1% by weight, and CaO: 27.5% by weight) each having a diameter of 5 mm and a height of 5 mm, they were heated at a temperature-raising rate of 15° C./minute up to 1,550° C., and after maintaining them for 2 hours at 1,550° C., they were allowed to cool. Also, after melting and solidifying, the angle of contact with the 13Cr steel and the angle of contact with the slag formed from the tablet-formed powders were measured. The angle of contact with the 13Cr steel was 102° and the angle of contact with the slag was 101°, which confirmed that the BN-containing material exhibited a good corrosion resistance to the molten steel and the molten slag. Also, the result of the 3-point bending test of a span length of 30 mm was 46 MPa, which confirmed that the material was made usable as a refractory for casting.

EXAMPLE 19

A mixture of 49.1% by weight of a $B_4C$ powder having particle sizes of not larger than 44 μm, 11.1% by weight of a $SiO_2$ powder having particles sizes of not larger than 10 μm, and 39.8% by weight of an Al powder having particle sizes of not larger than 74 μm was packed in a graphite vessel having a cavity of a diameter of 60 mm and a height of 50 mm in an amount of 50 g and the packed powders were lightly pressed by applying a surface pressure of 10 MPa thereto via a graphite plate having a diameter of 60 mm and a thickness of 5 mm. The graphite vessel was disposed in a graphite heating furnace, after heating the graphite vessel at a temperature-raising rate of 15° C./minute up to 1,600° C. while evacuating by means of a vacuum pump, a nitrogen gas was introduced to make the nitrogen gas pressure 1.0 MPa (absolute pressure), and after maintaining the system for 8 hours at 1,600° C., the graphite vessel was allowed to cool.

The weight of the sintered product obtained was 80.0 g, the bulk density thereof was 2.44 g/cm³, and the relative amount of voids was 6.2%. Also, through X-ray diffraction, BN, AlN, SiC, and C were identified. The composition presumed by the calculation was 55.1% by weight of BN, 37.5% by weight of AlN, 4.6% by weight of SiC, and 2.5% by weight of C. The residual carbon in this case corresponded to 38% of C constituting $B_4C$ of the starting materials.

From the sintered product, two samples each obtained by splitting the product to ¼ thereof and one sample obtained by splitting the product to ½ thereof were prepared, the former was supplied to a corrosion resistance test and from the latter, a test piece of 3 mm×4 mm×40 mm for a bending test was cut.

On one of the samples for the corrosion test was placed cubic 13 Cr steel having a side length of 5 mm, on another sample for the corrosion test were placed tablet-formed powders ($SiO_2$:35.2% by weight, $Al_2O_3$: 4.1% by weight, and CaO: 27.5% by weight) each having a diameter of 5 mm and a height of 5 mm, they were heated at a temperature-raising rate of 15° C./minute up to 1,550° C., and after maintaining them for 2 hours at 1,550° C., they were allowed to cool. Also, after melting and solidifying, the angle of contact with the 13Cr steel and the angle of contact with the slag formed from the tablet-formed powders were measured. The angle of contact with the 13Cr steel was 110° and the angle of contact with the slag was 104°, which confirmed that the containing material exhibited a good corrosion resistance to molten steel and molten slag. Also, the result of the 3 point bending test of a span length of 30 mm was 98 MPa, which confirmed that the material was made usable as a refractory for casting.

EXAMPLE 20

A mixture of 33.4% by weight of a $B_4C$ powder having particle sizes of not larger than 44 μm, 40.3% by weight of a baddeleyite powder having particles sizes of not larger than 44 μm, 12.1% by weight of a $SiO_2$ powder having particle sizes of not larger than 10 μm, and 14.2% by weight of an Al powder having particle sizes of not larger than 74 μm was packed in a graphite vessel having a cavity of a diameter of 60 mm and a height of 50 mm in an amount of 50 g and the packed powders were lightly pressed by applying a surface pressure of 10 MPa thereto via a graphite plate having a diameter of 60 mm and a thickness of 5 mm. The graphite vessel was disposed in a graphite heating furnace, after heating the graphite vessel at a temperature-raising rate of 15° C./minute up to 1,600° C. while evacuating by means of a vacuum pump, a nitrogen gas was introduced to make the nitrogen gas pressure 1.0 MPa (absolute pressure), and after maintaining the system for 8 hours at 1,600° C., the graphite vessel was allowed to cool.

The weight of the sintered product obtained was 64.8 g, the bulk density thereof was 1.89 g/cm³, and the relative amount of voids was 21.1%. Also, through X-ray diffraction, BN, $ZrO_2$ (monoclinic system), AlN, SiC, and ZrN were identified. The composition presumed by the calculation was 46.3% by weight of BN, 25.0% by weight of $ZrO_2$ (monoclinic system), 18.5% by weight of AlN, 6.2% by weight of SiC, and 4.0% by weight of ZrN.

From the sintered product, two samples each obtained by splitting the product to ¼ thereof and one sample obtained by splitting the product to ½ thereof were prepared, the former was supplied to a corrosion resistance test and from the latter, a test piece of 3 mm×4 mm×40 mm for a bending test was cut.

On one of the samples for the corrosion test was placed cubic 13 Cr steel having a side length of 5 mm, on another sample for the corrosion test were placed tablet-formed powders ($SiO_2$: 35.2% by weight, $Al_2O_3$: 4.1% by weight, and CaO: 27.5% by weight) each having a diameter of 5 mm and a height of 5 mm, they were heated at a temperature-raising rate of 15° C./minute up to 1,550° C., and after maintaining them for 2 hours at 1,550° C., they were allowed to cool. Also, after melting and solidifying, the angle of contact with the 13Cr steel and the angle of contact with the slag formed from the tablet-formed powders were measured. The angle of contact with the 13Cr steel was 100° and the angle of contact with the slag was 105°, which confirmed that the BN-containing material exhibited a good corrosion resistance to molten steel and molten slag. Also, the result of the 3 point bending test of a span length of 30 mm was 100 MPa, which confirmed that the material was made usable as a refractory for casting.

EXAMPLE 21

A ½ cut sample piece from the sintered product (composition: 84.4% by weight BN and 15.6% by weight $CaCN_2$) produced in Example 12 was placed in an agate pot together with 10 agate balls having a diameter of 10 mm, the pot was disposed in an epicyclic ball mill, and the sample piece was ground for 10 minutes. Based on the results, it was confirmed that the sample piece was completely ground, which confirmed that the powder of 84.4% by weight of BN was very easily obtained.

EXAMPLE 22

A mixed powder was prepared by mixing 50.5% by weight of a $B_4C$ powder having particle sizes of not larger than 44 μm and 49.5% by weight of an Al powder having particle sizes of not larger than 74 μm. On the other hand, as shown in FIG. 1, a core 1 of a graphite mold having an annular cavity 4 was constructed with an outer frame 2 having a screw portion 3. A BN powder was coated on the contact portion with the raw material powders as a mid-releasing agent. The volume of the cavity was 240 $cm^3$. The mixed powder 5 described above was packed in the cavity, the packed powders were pressed using a hand via a plate and then the powder was additionally supplied thereto to pack a total of 353 g of the powders into the cavity.

Figure 2:
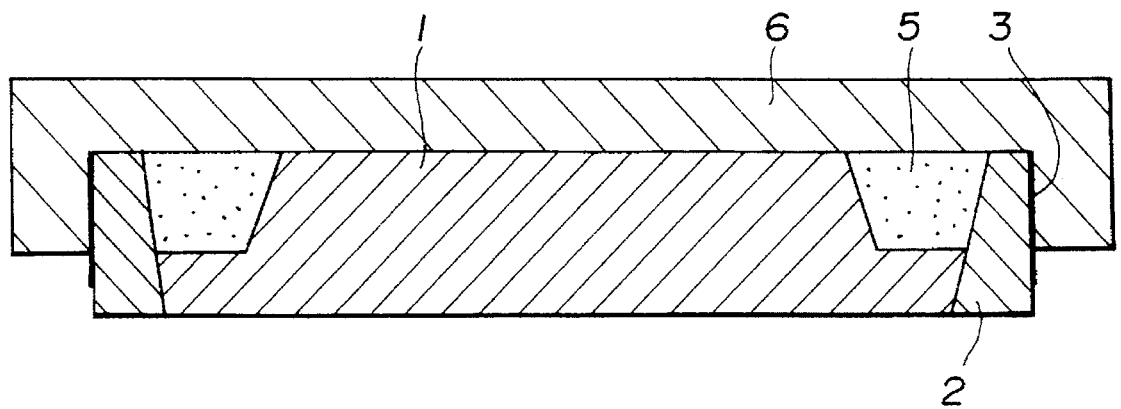
FIG. 2 is a view exhibiting the closing of the cavities of the mold by screwing an upper cover having screw portions onto the mold.

Then, as shown in FIG. 2, an upper cover 6 having a screw was screwed to close the cavity. The graphite mold was disposed in a graphite heating furnace, after heating the graphite mold at a temperature-raising rate of 15° C./minute up to 1,600° C. while evacuating by means of a vacuum pump, a nitrogen gas was introduced to make the nitrogen gas pressure 1.0 MPa (absolute pressure), and after heating the system for 8 hours at 1,600° C., the graphite mold was allowed to cool. The nitrogen gas was introduced into the packed powders through the screw portion 3 of the graphite mold and the connected portion of the core 1 and the upper frame 2.

Figure 3:
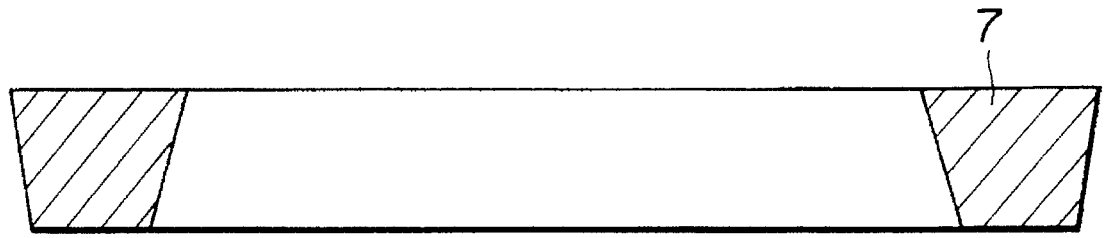
FIG. 3 is a cross-sectional view exhibiting a sintered product obtained by dissolving the mold of FIG. 2.

When the graphite mold was decomposed, a sintered product 7 shown in FIG. 3 was obtained. The shape of the sintered product was the completely transferred shape of the cavity shape. The weight thereof was 462 g, the bulk density was 1.92 $g/cm^3$, and the relative amount of voids was 7.2%.

COMPARATIVE EXAMPLE 1

A mixed powder was prepared by mixing 50.5% by weight of a $B_4C$ power having particle sizes of not larger than 44 μm and 49.5% by weight of an Al powder having particle sizes of not larger than 74 μm.

Figure 4:
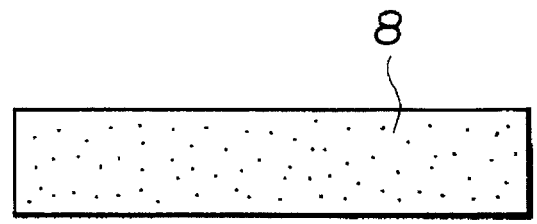
FIG. 4 is a view exhibiting a molding produced by a conventional method.

The mixed powder was meno-axially press molded at a molding pressure of 30 MPa to provide a sintered product having a size of 20 mm×23 ×50 mm and a weight of 35 g. FIG. 4 exhibits the shape of the sintered product 8 thus molded.

Figure 5:
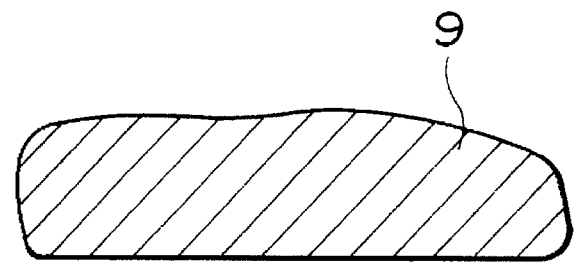
FIG. 5 is a view showing a sintered product produced by a conventional method.

The sintered product was disposed in a graphite heating furnace. After heating the sintered product at a temperature-raising rate of 15° C./minute up to 1,600° C. while evacuating by a vacuum pump, a nitrogen gas was introduced to make a nitrogen gas pressure 1.0 MPa (absolute pressure), and after maintaining the product for 8 hours at 1,600° C., the sintered product was allowed to cool. Thus, a sintered product 9 shown in FIG. 5 was obtained. The sintered product was largely deformed from the shape of the molding and the volume was increased. The weight was 46 g. When cut the sintered product, the presence of many cracks was observed. Thus, it was confirmed that when the molding was nitrified as it was, the molding was expanded, deformed, and cracked, whereby the production of parts was made very difficult.

COMPARATIVE EXAMPLE 2

A test piece of 30 mm×30 mm×20 mm was cut from the slag contact portion (composition: 68% by weight of $ZrO_2$, 3% by weight of $SiC_3$, and 23% by weight of C) of an immersion nozzle for continuous casting for a steel plate, tablets of the slag having the same compositions and sizes as in Examples 1 to 20 each were placed on the center of the test piece as in Examples 1 to 20, they were heated under the same conditions as in the examples (retained for 2 hours in an Ar atmosphere at 1,550° C.) and cooled slowly. The slag on the test piece thus treated almost wholly permeated into the inside the test piece and thus the angle of contact could not be measured. Thus, it was confirmed that the conventional immersion nozzle which was used at present was very liable to be corroded by a molten slag as compared with the boron-nitride-containing material of this invention which was resistant to being wetted with a molten slag.

In addition, the production conditions and the characteristics in Examples 1 to 21 described above are shown in following Tables 1 to 4.

TABLE 1

| Example | 1 | 2 | 3 | 4 | 5 |
| --- | --- | --- | --- | --- | --- |
| Starting Material | | | | | |
| Composition (wt %) | $CaB_6$ 25.4, $ZrO_2$ 74.6 | $CaB_6$ 25.4, $ZrO_2$ 74.6 | $B_4C$ 12.8, $ZrO_2$ 87.2 | $B_4C$ 20.3, $ZrO_2$ 79.7 | $CaB_6$ 1.5, $B_4C$ 11.3, $ZrO_2$ 87.2 |
| Ratio (%) of $ZrO_2$ of 10–44 μm | 80 | 80 | 80 | 80 | 80 |
| Packed Weight (Graphite vessel inside diameter 50 mm φ) (g) | 50.0 | 50.0 | 50.0 | 50.0 | 50.0 |
| Nitrification Condition | | | | | |
| $N_2$ Absolute Pressure MPa | 0.5 | 1.0 | 0.5 | 0.5 | 0.5 |
| Raising Temp. (°C./min) | 15 | 15 | 15 | 15 | 15 |
| Retention Temp. (°C.) | 1150 | 1600 | 1150 | 1600 | 1600 |
| Retention Time (hr.) | 48 | 8 | 8 | 8 | 8 |
| Sintered Product | | | | | |
| Weight (g) | 55.0 | 60.9 | 50.7 | 60.9 | 54.6 |

TABLE 1-continued

| Example | 1 | 2 | 3 | 4 | 5 |
|---|---|---|---|---|---|
| Bulk Density (g/cm$^3$) | 2.57 | 2.72 | 2.41 | 2.61 | 2.60 |
| Porosity (%) | 35.0 | 21.3 | 43.8 | 32.2 | 40.1 |
| X-Ray Diffraction | 3CaO.17ZrO$_2$, ZrO$_2$ (m), ZrB$_2$, BN | BN, 3CaO.17ZrO$_2$, ZrO, ZrO$_2$ (m) | ZrO$_2$ (m), ZrB$_2$, BN | ZrO$_2$ (m), ZrN, BN | ZrO$_2$ (m), ZrO$_2$ (c), BN |
| EDX Peak Ratio | (Ca + Zr)/B 3.9 | (Ca + Zr)/B 3.7 | Zr/B 6.5 | Zr/B 3.7 | (Ca + Zr)/B 6.6 |
| Molten Steel Resistance (degree)*$^1$ | 128 | 110 | 114 | 108 | 100 |
| Molten Slag Resistance (degree)*$^2$ | 110 | 110 | 110 | 110 | 105 |
| 3-Point Bending Strength (MPa)*$^3$ | 16 | 18 | 10 | 32 | 8 |

*$^1$: Angle of contact with 13 Cr steel
*$^2$: Angle of contact with molten slag
*$^3$: 3 mm × 4 mm × 30 mm span length

TABLE 2

| Example | 6 | 7 | 8 | 9 | 10 |
|---|---|---|---|---|---|
| Starting Material | | | | | |
| Composition (wt %) | CaB$_6$ 9.0, B$_4$C 20.3, Al$_2$O$_3$ 42.8, ZrO$_2$ | CaB$_6$ 43.4, Al$_2$O$_3$ 56.6 | CaB$_6$ 16.1, B$_4$C 50.9, Al$_2$O$_3$ 33.0 | B$_4$C 73.4, SiO$_2$ 26.6 | B$_4$C 47.5, ZrO$_2$.SiO$_2$ 52.5 |
| Ratio (%) of ZrO$_2$ of 10–44 μm | 80 | | | | |
| Packed Weight (Graphite vessel inside diameter 50 mm φ) (g) | 50.0 | 50.0 | 50.0 | 50.0 | 50.0 |
| Nitrification Condition | | | | | |
| N$_2$ Absolute Pressure MPa | 0.5 | 0.5 | 1.0 | 1.0 | 1.0 |
| Raising Temp. (°C./min) | 15 | 15 | 15 | 15 | 15 |
| Retention Temp. (°C.) | 1600 | 1600 | 1900 | 1600 | 1600 |
| Retention Time (hr.) | 3 | 3 | 8 | 8 | 8 |
| Sintered Product | | | | | |
| Weight (g) | 58.3 | 81.0 | 83.0 | 66.4 | 66.1 |
| Bulk Density (g/cm$^3$) | 2.59 | 2.04 | 1.75 | 1.76 | 2.24 |
| Porosity (%) | 27.8 | 20.1 | 31.0 | 12.7 | 18.0 |
| X-Ray Diffraction | ZrO$_2$ (m), CaO.2Al$_2$O$_3$, ZrB$_2$, BN | CaO.2Al$_2$O$_3$, BN | BN, AlN, CaO.2Al$_2$O$_3$ | BN, SiC | BN, ZrO$_2$ (m), SiC, ZrN |
| EDX Peak Ratio | | | | Si/B 0.4 | (Si + Zr)/B 1.2 |
| Molten Steel Resistance (degree)*$^1$ | 110 | 110 | 110 | 90 | 108 |
| Molten Slag Resistance (degree)*$^2$ | 100 | 90 | 92 | 120 | 110 |
| 3-Point Bending Strength (MPa)*$^3$ | 26 | 21 | 14 | 9 | 11 |

*$^1$: Angle of contact with 13 Cr steel;
*$^2$: Angle of contact with molten slag;
*$^3$: 3 mm × 4 mm × 30 mm span length

TABLE 3

| Example | 11 | 12 | 13 | 14 | 15 |
|---|---|---|---|---|---|
| Starting Material | | | | | |
| Composition (wt %) | $B_4C$ 43.9, $3Al_2O_3 \cdot 2SiO_2$ 56.1 | $CaB_6$ 48.7, $B_4C$ 51.3 | $CaB_6$ 48.7, $B_4C$ 51.3 | $CaB_6$ 27.8, $B_4C$ 29.3, Al 42.9 | $CaB_6$ 13.5, $B_4C$ 43.7, Al 42.8 |
| Packed Weight (Graphite vessel inside diameter 50 mm φ) (g) | 50.0 | 50.0 | 50.0 | 50.0 | 50.0 |
| Nitrification Condition | | | | | |
| $N_2$ Absolute Pressure MPa | 1.0 | 1.0 | 1.0 | 1.0 | 1.0 |
| Raising Temp. (°C./min) | 15 | 15 | 15 | 15 | 15 |
| Retention Temp. (°C.) | 1600 | 1600 | 1600 | 1600 | 1600 |
| Retention Time (hr.) | 8 | 8 | 8 | 8 | 8 |
| Sintered Product | | | | | |
| Weight (g) | 64.6 | 91.1 | 80.2 | 87.1 | 83.4 |
| Bulk Density (g/cm³) | 2.15 | 1.71 | 2.18 | 2.24 | 2.10 |
| Porosity (%) | 19.2 | 24.4 | 3.5 | 12.0 | 5.0 |
| X-Ray Diffraction | $Al_2O_3$, BN, SiC | BN 84.4, $CaCN_2$ 15.6 | BN 60.6, $CaB_6$ 32.1, C 7.3 | BN 52.8, AlN 37.4, $CaCN_2$ 9.8 | BN 47.2, AlN 39.0, $CaB_6$ 8.1, C 5.7 |
| Molten Steel Resistance (degree)*1 | 100 | Reacted | Reacted | 110 | 110 |
| Molten Slag Resistance (degree)*2 | 105 | 104 | 105 | 88 | 86 |
| 3-Point Bending Strength (MPa)*3 | 18 | 6 | 8 | 32 | 34 |

*1: Angle of contact with 13 Cr steel
*2: Angle of contact with molten slag
*3: 3 mm × 4 mm × 30 mm span length

TABLE 4

| Example | 16 | 17 | 18 | 19 | 20 |
|---|---|---|---|---|---|
| Starting Material | | | | | |
| Composition (wt %) | $CaB_6$ 18.2, $B_4C$ 19.1, Al 28.0, $ZrO_2$ 34.7 | $B_4C$ 50.5, Al 49.5 | $SiO_2$ 15.9, $B_4C$ 43.9, $ZrO_2$ 40.2 | $SiO_2$ 11.1, $B_4C$ 49.1, Al 39.8 | $SiO_2$ 12.1, $B_4C$ 33.4, $ZrO_2$ 40.3, Al 14.2 |
| Packed Weight (Graphite vessel inside diameter 50 mm φ) (g) | 50.0 | 50.0 | 50.0 | 50.0 | 50.0 |
| Nitrification Condition | | | | | |
| $N_2$ Absolute Pressure MPa | 1.0 | 1.0 | 1.0 | 1.0 | 1.0 |
| Raising Temp. (°C./min) | 15 | 15 | 15 | 15 | 15 |
| Retention Temp. (°C.) | 1600 | 1600 | 1600 | 1600 | 1600 |
| Retention Time (hr.) | 8 | 8 | 8 | 8 | 8 |
| Sintered Product | | | | | |
| Weight (g) | 74.0 | 65.7 | 64.2 | 80.0 | 64.8 |
| Bulk Density (g/cm³) | 2.59 | 1.93 | 1.78 | 2.44 | 1.89 |
| Porosity (%) | 11.8 | 7.1 | 18.9 | 6.2 | 21.1 |

TABLE 4-continued

| Example | 16 | 17 | 18 | 19 | 20 |
|---|---|---|---|---|---|
| X-Ray Diffraction | BN 40.5, AlN 28.7, 3CaO. 17ZrO$_2$ 23.3, CaCN$_2$ 7.5 | BN 51.4, AlN 42.4, C 6.2 | BN 60.8, ZrO$_2$ (m) 28.0, SiC 8.2, ZrN 3.0 | BN 55.1, AlN 37.8, SiC 4.6, C 2.5 | BN 46.3, ZrO$_2$ (m) 25.0, AlN 18.5, SiC 6.2, ZrN 4.0 |
| Molten Steel Resistance (degree)*[1] | 100 | 110 | 102 | 110 | 100 |
| Molten Slag Resistance (degree)*[2] | 96 | 90 | 101 | 104 | 105 |
| 3-Point Bending Strength (MPa)*[3] | 25 | 110 | 46 | 98 | 100 |

*[1]: Angle of contact with 13 Cr steel
*[2]: Angle of contact with molten slag
*[3]: 3 mm × 4 mm × 30 mm span length

What is claimed is:

1. A method for producing boron nitride containing material comprising the steps of:

preparing a mixed powder including a first boride and a first oxide, the boride consisting of boron and another element the first oxide being at least one oxide selected from the group consisting of TiO$_2$, ZrO$_2$, Cr$_2$O$_3$, Al$_2$O$_3$ and SiO$_2$;

heating the mixed powder in a nitriding atmosphere to reduce the first oxide by said another element in the boride, to a boron nitride and at least one selected from the group consisting of a second oxide having less bonded oxygen than the first oxide, an oxynitride, a nitride, a carbide and a second boride, resulting in a boron nitride containing material.

2. The method of claim 1 wherein the first boride is at least one boride selected from the group consisting of MgB$_2$, CaB$_6$, AlB$_2$, AlB$_{12}$, TiB$_2$, ZrB$_2$ and B$_4$C.

3. The method of claim 1, wherein the first oxide is at least one oxide selected from the group consisting of ZrO$_2$, Cr$_2$O$_3$, Al$_2$O$_3$ and SiO$_2$.

4. The method of claim 3, wherein the first oxide is ZrO$_2$ and 20 to 100 wt. % of said ZrO$_2$ is a monoclinic ZrO$_2$ powder having a particle size of 10 to 44 μm.

5. The method of claim 1, further comprising the step of disintegrating the boron nitride containing material into powder.

6. The method of claim 1, wherein
the mixed powder comprises 5 to 60 wt. % CaB$_6$ and 40 to 95 wt. % ZrO$_2$; and
the mixed powder is heated to a temperature of 1000° to 1500° C.

7. The method of claim 1, wherein
the mixed powder comprises 5 to 60 wt. % CaB$_6$ and 40 to 95 wt. % ZrO$_2$; and
the mixed powder is heated to a temperature of 1300° to 1900° C.

8. The method of claim 1, wherein
the mixed powder comprises 5 to 60 wt. % B$_4$C and 40 to 95 wt. % ZrO$_2$; and
the mixed powder is heated to a temperature of 1000° to 1500° C.

9. The method of claim 1, wherein
the mixed powder comprises 5 to 60 wt. % B$_4$C and 40 to 95 wt. % ZrO$_2$; and
the mixed powder is heated to a temperature of 1300° to 1900° C.

10. The method of claim 1, wherein
the mixed powder comprises 1 to 5 wt. % CaB$_6$, 10 to 50 wt. % B$_4$C and 15 to 90 wt. % ZrO$_2$; and
the mixed powder is heated to a temperature of 1300° to 1900° C.

11. The method of claim 1, wherein
the mixed powder comprises 5 to 60 wt. % CaB$_6$, 5 to 90 wt. % Al$_2$O$_{23}$ and 5 to 90 wt. % ZrO$_2$; and
the mixed powder is heated to a temperature of 1000° to 1900° C.

12. The method of claim 1, wherein
the mixed powder comprises 5 to 60 wt. % CaB$_6$ and 5 to 95 wt. % Al$_2$O$_3$; and
the mixed powder is heated to a temperature of 1300° to 1900° C.

13. The method of claim 1, wherein
the mixed powder comprises 5 to 60 wt. % B$_4$C and 5 to 90 wt. % Al$_2$O$_3$; and
the mixed powder is heated to a temperature of 1600° to 2300° C.

14. The method of claim 1, wherein
the mixed powder comprises 1 to 20 wt. % CaB$_6$, 5 to 60 wt. % B$_4$C and 5 to 90 wt. % Al$_2$O$_3$; and
the mixed powder is heated to a temperature of 1600° to 2300° C.

15. The method of claim 1, wherein
the mixed powder comprises 10 to 80 wt. % B$_4$C and 10 to 90 wt. % SiO$_2$; and
the mixed powder is heated to a temperature of 1300° to 1900° C.

16. The method of claim 1, wherein
the mixed powder comprises 10 to 60 wt. % B$_4$C and 40 to 90 wt. % zircon; and
the mixed powder is heated to a temperature of 1300° to 1900° C.

17. The method of claim 1, wherein
the mixed powder comprises 10 to 60 wt. % B$_4$C and 40 to 90 wt. % mullite; and
the mixed powder is heated to a temperature of 1300° to 1900° C.

18. The method of claim 1, wherein
said mixed powder including a boride and a first oxide is packed in a heat-resistant mold and the packed material is restrained by the heat-resistant mold; and
the heat-resistant mold including the packed material is heated to convert the packed material to a sintered product.

19. A method for producing boron nitride containing material comprising the steps of:

preparing a mixed ponder including a boride and Al; and heating the mixed powder in a nitriding atmosphere to produce a boron nitride and AlN.

20. The method of claim 19, wherein the mixed powder comprises 10 to 70 wt. % $B_4C$ and 30 to 90 wt. % Al; and the mixed powder is heated to a temperature of 1300° to 2000° C.

21. The method of claim 19, wherein said mixed powder including a boride is packed in a heat-resistant mold and the packed material is restrained by the heat-resistant mold; and the heat-resistant mold including the packed material is heated to convert the packed material to a sintered product.

22. A method for producing boron nitride containing material comprising the steps of:

preparing a mixed powder including a first boride and a first oxide, the boride consisting of boron and another element the first oxide being an oxide of at least two elements including at least one selected from the group consisting of $TiO_2$, $ZrO_2$, $Cr_2O_3$, $Al_2O_3$ and $SiO_2$;

heating the mixed powder in a nitriding atmosphere to reduce the first oxide by said another element in the boride to a boron nitride and at least one selected from the group consisting of a second oxide having less bonded oxygen than the first oxide, an oxynitride, a nitride, a carbide and a second boride, resulting in a boron nitride containing material.

23. The method of claim 22 wherein the first boride is at least one boride selected from the group consisting of $MgB_2$, $CaB_6$, $AlB_2$, $AlB_{12}$, $TiB_2$, $ZrB_2$ and $B_4C$.

24. The method of claim 23 wherein the first oxide is selected from the group consisting of $Al_2O_3 \cdot P_2O_5$, $3Al_2O_3 \cdot 2SiO_2$, $Al_2O_3 \cdot TiO_2$, $Al_2O_3 \cdot 2TiO_2$, $BaO \cdot Al_2O_3$, $BaO_6 \cdot Al_2O_3$, $BaO \cdot Al_2O_3 \cdot 2SiO_2$, $2BaO \cdot SiO_2$, $BaO \cdot ZrO_2$, $BeO \cdot Al_2O_3$, $BeO \cdot SiO_2$, $2BeO \cdot SiO_2$, $3BeO \cdot TiO_2$, $3BeO \cdot 2ZrO_2$, $3CaO_5 \cdot Al_2O_3$, $CaO \cdot CrO_3$, $CaO \cdot Cr_2O_3$, $CaO \cdot HfO_2$, $3CaO \cdot P_2O_5$, $4CaO \cdot P_2O_5$, $3CaO \cdot SiO_2$, $2CaO \cdot SiO_2$, $5CaO \cdot SiO_2 \cdot P_2O_5$, $CaO \cdot TiO_2$, $2CaO \cdot TiO_2$, $3Cao \cdot TiO_2$, $CaO \cdot ZrO_2$, $CoO \cdot Al_2O_3$, $FeO \cdot Cr_2O_3$, $MgO \cdot Al_2O_3$, $MgO \cdot Cr_2O_3$, $MgO \cdot Fe_2O_3$, $MgO \cdot La_2O_3$, $2MgO \cdot SiO_2$, $2MgO \cdot TiO_2$, $Mgo \cdot ZrO_2$, $MgO \cdot ZrO_2 \cdot SiO_2$, $NiO \cdot Al_2O_3$, $K_2O \cdot Al_2O_3 \cdot 2SiO_2$, $SrO \cdot Al_2O_3$, $3SrO \cdot P_2O_5$, $SrO \cdot ZrO_2$, $ThO_2 \cdot ZrO_2$, $ZnO \cdot Al_2O_3$, $ZnO \cdot ArO_2 \cdot SiO_2$, and $ZrO_2 \cdot SiO_2$.

25. The method of claim 23 wherein the first oxide is selected from the group consisting of $Al_2O_3 \cdot P_2O_3$, $3Al_2O_3 \cdot 2SiO_2$, $Al_2O_3 \cdot TiO_2$, $Al_2O_3$, $BaO_6 \cdot Al_2O_3$, $BaO \cdot Al_2O_3 \cdot 2SiO_2$, $2BaO \cdot SiO_2$, $BaO \cdot ZrO_2$, $BeO \cdot Al_2O_3$, $BeO \cdot SiO_2$, $2BeO \cdot SiO_2$, $3BeO \cdot TiO_2$, $3BeO \cdot 2ZrO_2$, $3CaO_5 \cdot Al_2O_3$, $CaO \cdot CrO_3$, $CaO \cdot Cr_2O_3$, $CaO \cdot HfO_2$, $3CaO \cdot P_2O_5$, $4CaO \cdot P_2O_5$, $3CaO \cdot SiO_2$, $2CaO \cdot SiO_2$, $5CaO \cdot SiO_2 \cdot P_2O_5$, $CaO \cdot TiO_2$, $2CaO \cdot TiO_2$, $3CaO \cdot TiO_2$, $CaO \cdot ZrO_2$, $CoO \cdot Al_2O_3$, $FeO \cdot Cr_2O_3$, $MgO \cdot Al_2O_3$, $MgO \cdot Cr_2O_3$, $MgO \cdot Fe_2O_3$, $MgO \cdot La_2O_3$, $2MgO \cdot SiO_2$, $2MgO \cdot TiO_2$, $MgO \cdot ZrO_2$, $MgO \cdot ZrO_2 \cdot SiO_2$, $NiO \cdot Al_2O_3$, $K_2O \cdot Al_2o_3 \cdot 2SiO_2$, $SrO \cdot Al_2O_3$, $3SrO \cdot P_2O_5$, $SrO \cdot ZrO_2$, $ThO_2 \cdot ZrO_2$, $ZnO \cdot Al_2O_3$, $ZnO \cdot ZrO_2 \cdot SiO_2$, and $ZrO_2 \cdot SiO_2$.

* * * * *

UNITED STATES PATENT AND TRADEMARK OFFICE
CERTIFICATE OF CORRECTION

PATENT NO. : 5,633,214
DATED : May 27, 1997
INVENTOR(S) : Nishio et al

It is certified that error appears in the above-identified patent and that said Letters Patent is hereby corrected as shown below:

Column 11, line 36: delete "beth" and insert --both--.

Column 47, line 28 (Claim 22): after "boride" insert -- , --.

Column 48, line 18 (Claim 25): delete "23" and insert -- 22 --.

Signed and Sealed this

Thirty-first Day of August, 1999

Attest:

Q. TODD DICKINSON

*Attesting Officer*   *Acting Commissioner of Patents and Trademarks*